(12) United States Patent
Jansma

(10) Patent No.: US 11,938,573 B2
(45) Date of Patent: Mar. 26, 2024

(54) WELDING SYSTEMS FOR COOLING WELDING CONTACT TIPS

(71) Applicant: Illinois Tool Works Inc., Glenview, IL (US)

(72) Inventor: Jeremy L. Jansma, Lowell, IN (US)

(73) Assignee: ILLLINOIS TOOL WORKS INC., Glenview, IL (US)

( * ) Notice: Subject to any disclaimer, the term of this patent is extended or adjusted under 35 U.S.C. 154(b) by 1427 days.

(21) Appl. No.: 15/956,515

(22) Filed: Apr. 18, 2018

(65) Prior Publication Data

US 2018/0304395 A1 Oct. 25, 2018

Related U.S. Application Data

(60) Provisional application No. 62/487,199, filed on Apr. 19, 2017.

(51) Int. Cl.
*B23K 9/12* (2006.01)
*B23K 9/173* (2006.01)
(Continued)

(52) U.S. Cl.
CPC .............. *B23K 9/124* (2013.01); *B23K 9/173* (2013.01); *B23K 9/26* (2013.01); *B23K 9/295* (2013.01); *B23K 9/325* (2013.01); *B23P 19/12* (2013.01)

(58) Field of Classification Search
CPC .......... B23K 9/124; B23K 9/173; B23K 9/26; B23K 9/295; B23K 9/325; B23K 9/326
(Continued)

(56) References Cited

U.S. PATENT DOCUMENTS 2,297,548 A 9/1942 Fox et al.
3,083,290 A 3/1963 Kennedy
(Continued)

FOREIGN PATENT DOCUMENTS

CA 2242273 2/2000
CH 509127 6/1971
(Continued)

OTHER PUBLICATIONS

Excerpt from Victor Equipment Company Brochure, pp. 24,32,34 (1951).
(Continued)

*Primary Examiner* — Tu B Hoang
*Assistant Examiner* — Alba T Rosario-Aponte
(74) *Attorney, Agent, or Firm* — McAndrews, Held & Malloy, Ltd.

(57) ABSTRACT

Some examples of the present disclosure relate to welding systems that provide cooling gas flow to contact tips. The contact tip may be retained within a neck and nozzle assembly of a welding torch that receives gas, such as shielding gas, for example, from the welding system. A tip retention-device and gas diffuser may cooperate to retain the contact tip within the neck and nozzle assembly. The gas diffuser may have axial gas channels configured to direct the shielding gas over and/or across a rear portion of the contact tip seated within the gas diffuser. The tip retention device may have gas channels configured to guide gas flow from the gas diffuser over and/or across a forward portion of the contact tip. The gas flow may help to cool the contact tip before, during, and/or after welding, which may extend the life of the contact tip.

4 Claims, 20 Drawing Sheets

(51) Int. Cl.
  *B23K 9/26* (2006.01)
  *B23K 9/29* (2006.01)
  *B23K 9/32* (2006.01)
  *B23P 19/12* (2006.01)

(58) Field of Classification Search
  USPC .................................................. 219/137.42
  See application file for complete search history.

(56) References Cited

U.S. PATENT DOCUMENTS

| | | |
|---|---|---|
| 3,121,784 A | 2/1964 | Mcginty et al. |
| 3,210,523 A | 10/1965 | Cotter |
| 3,270,179 A | 8/1966 | Russell |
| 3,283,121 A | 11/1966 | Bernard et al. |
| 3,469,070 A | 9/1969 | Bernard et al. |
| 3,487,194 A | 12/1969 | Poulton et al. |
| 3,488,468 A | 1/1970 | Carbone |
| 3,514,570 A | 5/1970 | Bernard et al. |
| 3,529,126 A | 9/1970 | Reeh |
| 3,529,128 A | 9/1970 | Cruz |
| 3,541,298 A | 11/1970 | Carkhuff |
| 3,576,423 A | 4/1971 | Bernard |
| 3,596,049 A | 7/1971 | Ogden |
| 3,597,576 A | 8/1971 | Bernard et al. |
| 3,629,547 A | 12/1971 | Kester et al. |
| 3,659,076 A * | 4/1972 | Ogden, Sr. ............ B23K 9/295 219/137.42 |
| 3,689,732 A | 9/1972 | Hill |
| 3,825,720 A | 7/1974 | Zillinger |
| 3,878,354 A | 4/1975 | Frantzreb |
| 3,934,782 A | 1/1976 | Cushman et al. |
| 3,940,586 A | 2/1976 | Stearns et al. |
| 4,008,384 A | 2/1977 | Cecil |
| 4,049,943 A | 9/1977 | Pratt |
| 4,158,763 A | 6/1979 | Moerke |
| 4,280,043 A | 7/1981 | Feix |
| 4,297,561 A | 10/1981 | Townsend et al. |
| 4,403,136 A | 9/1983 | Colman |
| 4,464,560 A | 8/1984 | Church |
| 4,529,863 A | 7/1985 | Lebel |
| 4,554,432 A | 11/1985 | Raloff |
| 4,563,569 A | 1/1986 | Shiramizu |
| 4,672,163 A | 6/1987 | Matsui |
| 4,675,493 A | 6/1987 | Gartland |
| 4,731,518 A | 3/1988 | Parmelee |
| 4,767,908 A | 8/1988 | Dallavalle |
| 4,945,208 A | 7/1990 | Lian |
| 4,954,688 A | 9/1990 | Winterfeldt |
| 4,978,831 A | 12/1990 | Lian |
| 4,994,707 A | 2/1991 | Stark |
| 5,013,885 A | 5/1991 | Carkhuff |
| 5,132,513 A | 7/1992 | Ingwersen et al. |
| 5,258,599 A | 11/1993 | Moerke |
| 5,260,546 A | 11/1993 | Ingwersen |
| 5,338,917 A | 8/1994 | Stuart |
| 5,380,980 A | 1/1995 | Colling |
| 5,440,100 A | 8/1995 | Stuart |
| 5,491,321 A | 2/1996 | Stuart |
| 5,635,090 A | 6/1997 | Lubieniecki |
| 5,669,556 A | 9/1997 | Yoshida |
| 5,726,420 A | 3/1998 | Lajoie |
| 5,760,373 A | 6/1998 | Colling |
| 5,772,102 A | 6/1998 | New |
| 6,075,227 A | 6/2000 | Lajoie |
| 6,078,023 A | 6/2000 | Jones |
| 6,163,008 A | 12/2000 | Roberts |
| 6,176,412 B1 | 1/2001 | Weinger et al. |
| 6,191,380 B1 | 2/2001 | Thomas |
| 6,225,599 B1 | 5/2001 | Alterkruse |
| 6,271,497 B1 | 8/2001 | Zapletal |
| 6,307,179 B1 | 10/2001 | Walters |
| 6,525,297 B2 | 2/2003 | Doherty |
| 6,657,162 B1 | 12/2003 | Jung |
| 6,689,987 B2 | 2/2004 | Altekruse et al. |
| 6,744,013 B2 | 6/2004 | Jones |
| 6,774,013 B2 | 8/2004 | Dowben et al. |
| 6,847,009 B2 | 1/2005 | Stuart |
| 6,924,461 B2 | 8/2005 | Matiash |
| 7,105,775 B2 | 9/2006 | Giese |
| 7,176,412 B2 | 2/2007 | Wells |
| 7,244,909 B2 | 7/2007 | Kensrue et al. |
| 7,271,366 B2 | 9/2007 | Kensrue |
| 7,342,200 B2 | 3/2008 | Eberle |
| 7,381,923 B2 | 6/2008 | Gordon et al. |
| 7,576,300 B2 | 8/2009 | Giese |
| 7,905,741 B1 | 3/2011 | Wade et al. |
| 8,552,341 B2 | 10/2013 | Zamuner |
| 9,302,341 B2 | 4/2016 | Oh et al. |
| 9,308,599 B2 | 4/2016 | Sadowski |
| 9,527,155 B2 | 12/2016 | Meess |
| 9,539,663 B2 | 1/2017 | Grossauer et al. |
| 9,572,243 B2 | 2/2017 | Namburu |
| 9,669,486 B2 | 6/2017 | Dingeldein |
| 9,950,386 B2 | 4/2018 | Cooper et al. |
| 10,052,708 B2 | 8/2018 | Redding et al. |
| 2002/0113047 A1 | 8/2002 | Doherty |
| 2002/0117484 A1 | 8/2002 | Jones et al. |
| 2003/0057196 A1 | 3/2003 | Jones |
| 2003/0209530 A1* | 11/2003 | Stuart ............ B23K 9/173 219/137.61 |
| 2004/0026394 A1* | 2/2004 | Giese ............ B23K 9/295 219/137.42 |
| 2004/0026395 A1 | 2/2004 | Giese |
| 2004/0079741 A1 | 4/2004 | Keegan |
| 2004/0079784 A1 | 4/2004 | Giese |
| 2005/0109738 A1 | 5/2005 | Hewett et al. |
| 2005/0218132 A1* | 10/2005 | Wells ............ B23K 9/291 219/137.61 |
| 2006/0226132 A1 | 10/2006 | Giese |
| 2006/0226133 A1 | 10/2006 | Giese |
| 2006/0226134 A1 | 10/2006 | Giese et al. |
| 2006/0289413 A1 | 12/2006 | Eberle |
| 2007/0056945 A1 | 3/2007 | Hammen |
| 2007/0062922 A1 | 3/2007 | Zamuner |
| 2007/0108173 A1 | 5/2007 | Zamuner |
| 2007/0210049 A1 | 9/2007 | Dingeldein |
| 2008/0035623 A1 | 2/2008 | Hutchison |
| 2010/0012637 A1 | 1/2010 | Jaegar |
| 2011/0006522 A1 | 1/2011 | Bichler et al. |
| 2012/0125903 A1 | 5/2012 | Izutani et al. |
| 2013/0112661 A1 | 5/2013 | Dambra |
| 2013/0126504 A1 | 5/2013 | Hassan |
| 2013/0126505 A1 | 5/2013 | Hassan |
| 2013/0126506 A1 | 5/2013 | Hassan |
| 2013/0134143 A1 | 5/2013 | Hassan |
| 2014/0131335 A1 | 5/2014 | Giese |
| 2014/0131336 A1 | 5/2014 | Jacques |
| 2014/0251972 A1 | 9/2014 | Garvey et al. |
| 2014/0263250 A1 | 9/2014 | Meess et al. |
| 2014/0263251 A1 | 9/2014 | Enyedy |
| 2014/0263253 A1 | 9/2014 | Meess |
| 2014/0263254 A1 | 9/2014 | Enyedy |
| 2014/0319103 A1 | 10/2014 | Stabb et al. |
| 2014/0374399 A1 | 12/2014 | Kachline |
| 2015/0129570 A1 | 5/2015 | Redding |
| 2015/0129571 A1 | 5/2015 | Hassan |
| 2015/0129572 A1 | 5/2015 | Hassan |
| 2015/0135796 A1 | 5/2015 | Hassan |
| 2015/0136747 A1 | 5/2015 | Hassan |
| 2015/0136748 A1 | 5/2015 | Hassan |
| 2015/0136749 A1 | 5/2015 | Hassan |
| 2015/0165542 A1 | 6/2015 | Hassan |
| 2015/0190879 A1 | 7/2015 | Kachline |
| 2016/0144446 A1 | 5/2016 | Centner |
| 2017/0080510 A1 | 3/2017 | Centner |
| 2017/0080511 A1* | 3/2017 | Jaeger ............ B23K 9/173 |

FOREIGN PATENT DOCUMENTS

| | | |
|---|---|---|
| CN | 87102295 | 10/1987 |
| CN | 1491767 | 4/2004 |
| CN | 1935439 | 3/2007 |
| CN | 100391677 | 6/2008 |

(56) References Cited

FOREIGN PATENT DOCUMENTS

| | | |
|---|---|---|
| CN | 102101212 | 6/2011 |
| CN | 102145426 | 8/2011 |
| CN | 103998174 | 8/2014 |
| CN | 104245209 | 12/2014 |
| CN | 204867744 | 12/2015 |
| CN | 205496760 | 8/2016 |
| CN | 106465529 | 2/2017 |
| DE | 202013102979 | 7/2013 |
| EP | 0231153 A2 | 8/1987 |
| EP | 1388388 | 2/2004 |
| EP | 2193871 | 6/2010 |
| EP | 2457682 | 5/2012 |
| FR | 2291819 | 11/1974 |
| FR | 2291819 A1 | 6/1976 |
| FR | 3019707 | 10/2015 |
| JP | H05196022 U | 8/1976 |
| JP | 5290444 | 7/1977 |
| JP | S55156680 A | 12/1980 |
| JP | S57134279 A | 8/1982 |
| JP | H1119774 | 1/1999 |
| KR | 20090058801 | 6/2009 |
| KR | 101412374 | 6/2014 |
| WO | 0073700 A1 | 12/2000 |
| WO | 2007030720 | 3/2007 |
| WO | 2008018979 | 4/2008 |
| WO | 2017048536 | 3/2017 |

OTHER PUBLICATIONS

Excerpt from Victor Equipment Company Welding and Cutting Equipment Brochure, Catalog 20C 10-51 CW (1965).
International Search Report from PCT application No. PCT/US2016/050161, dated Nov. 17, 2016, 12 pgs.
Sugimoto et al., "English Translation of JP 55156680 A", U.S. Patent & Trademark Office (Sep. 25, 2006).
Extended European Search Report for European Patent Application No. 18153004.9, dated Jun. 22, 2018, 6 pages.
Extended European Search Report for European Application No. 18151151.0, dated Jul. 5, 2018, 6 pages.
Canadian Office Action for Application No. 2,996,229, dated Sep. 20, 2019, 3 pages.
European Office Action for European Patent Application No. 18723157.6 dated Nov. 20, 2020, 4 pages.
International Search Report for International Application No. PCT/US2018/028255 dated Jul. 5, 2018, 5 pages.
European Office Communication with extended search report Appln No. 22200423.6 dated Jun. 29, 2023, 7 pages.

* cited by examiner

WELDING SYSTEMS FOR COOLING WELDING CONTACT TIPS

CROSS REFERENCE TO RELATED APPLICATIONS

The present application claims the benefit of U.S. Provisional Patent Application No. 62/487,199, entitled "SYSTEM FOR COOLING A WELDING CONTACT TIP," filed Apr. 19, 2017, the entire contents of which are expressly incorporated herein by reference.

TECHNICAL FIELD

The present disclosure generally relates to welding torches and, more particularly, to welding systems for cooling welding contact tips.

BACKGROUND

Welding torches undergo wear and tear due to a variety of factors. Welding torch contact tips may experience added wear and tear due, at least in part, to their close proximity with the high temperature welding arcs that the welding torches produce. Contact tip wear and tear may be exacerbated by the high temperatures produced by the welding arcs.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to apparatus, systems, and methods for cooling a contact tip, such as in a welding system, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

DETAILED DESCRIPTION

Figure 1:
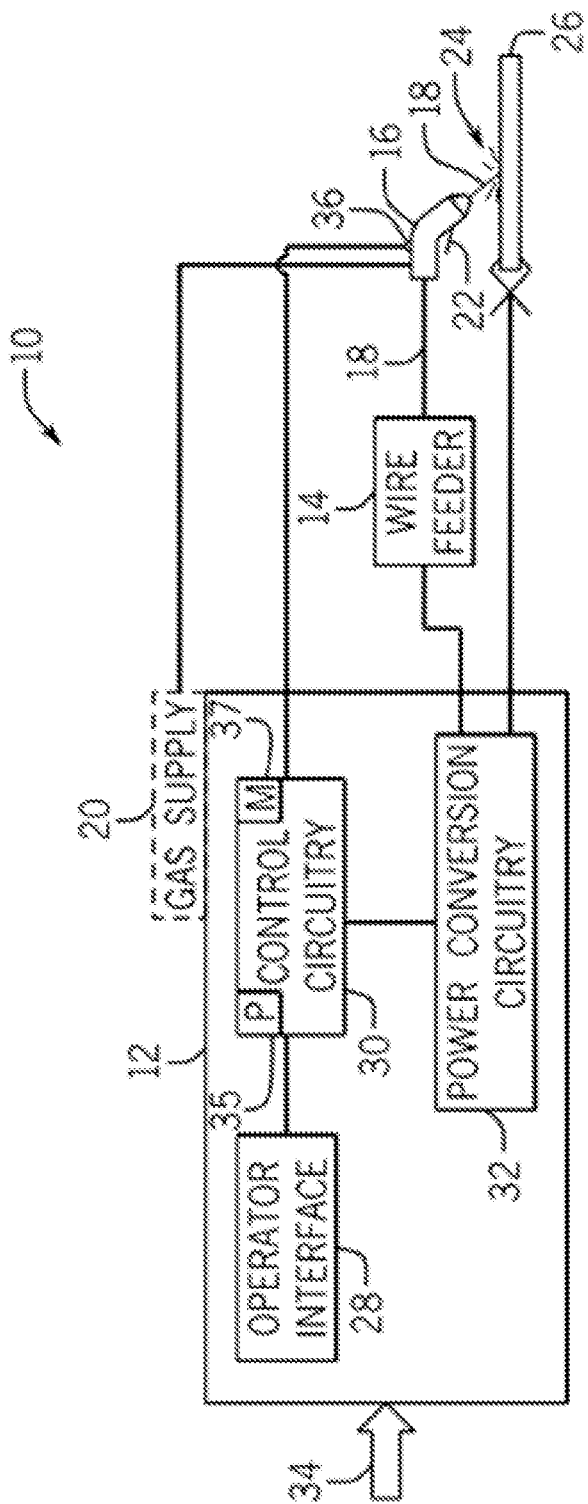
FIG. 1 is an example of a welding system, in accordance with aspects of this disclosure.

Preferred examples of the present disclosure are described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. As utilized herein, the terms "e.g." and "for example" set off lists of one or more non-limiting examples, instances, or illustrations.

As used herein, a welding-type power supply and/or power source refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Welding-type power, as used herein, refers to power suitable for welding, cladding, plasma cutting, induction heating, CAC-A and/or hot wire welding/preheating (including laser welding and laser cladding), carbon arc cutting or gouging, and/or resistive preheating.

The terms "coupled," "coupled to," and "coupled with" as used herein, each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

The terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, the terms "front" and/or "forward" refer to locations closer to a welding arc, while "rear," "back," "behind," and/or "backward" refers to locations farther from a welding arc.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

Some examples of the present disclosure relate to a welding torch, comprising a contact tip having a rear outer surface, and a gas diffuser configured to receive the rear outer surface within a gas flow path on an interior of the gas diffuser.

In some examples, the gas flow path comprises an axial gas channel configured to direct the gas over the rear outer surface of the contact tip. In some examples, the gas diffuser includes a seat configured to receive the contact tip within the gas diffuser. In some examples, the seat is defined by a plurality of teeth, each tooth includes a shelf, and the contact tip includes a shoulder that interfaces with the shelf of each tooth. In some examples, the gas diffuser comprises a nose that encircles a hollow interior, and the teeth extend from an interior surface of the nose into the hollow interior. In some examples, the gas flow path comprises a plurality of axial gas channels disposed on the interior surface of the nose, between the teeth, and the plurality of axial gas channels are configured to direct the gas over the rear outer surface of the contact tip. In some examples, a diameter of the hollow interior is larger at the axial gas channels than at the teeth. In some examples, the rear outer surface of the contact tip includes a deflector surface that is configured to guide the gas away from an axis of the contact tip. In some examples, the gas diffuser includes a chamfer that is configured to provide clearance for the deflector surface of the contact tip.

Some examples of the present disclosure relate to a gas diffuser for use in a welding application, comprising a seat configured to retain an outer surface of a contact tip within a gas flow path on an interior of the gas diffuser, where the gas flow path extends adjacent to the outer surface when the contact tip is retained within the gas diffuser.

In some examples, the seat is configured to interface with the outer surface of the contact tip to retain the contact tip within the gas diffuser. In some examples, the seat is defined by a plurality of teeth, and each tooth includes a shelf configured to interface with the outer surface of the contact tip. In some examples, the gas diffuser further comprises a nose that encircles a hollow interior, and the teeth extend from an interior surface of the nose into the hollow interior. In some examples, the gas flow path comprises a plurality of axial gas channels, and the plurality of axial gas channels are disposed between the teeth. In some examples, a diameter of the hollow interior is larger at the axial gas channels than at the teeth.

Some examples of the present disclosure relate to a method for cooling a contact tip of a welding torch, comprising routing a gas to a gas diffuser of the welding torch, routing the gas adjacent a first outer surface of a contact tip, where the first outer surface is retained within the gas diffuser, and routing the gas adjacent a second outer surface of the contact tip, where the second outer surface is not retained within the gas diffuser.

In some examples, the gas is routed adjacent the first outer surface via a channel formed within the gas diffuser. In some examples, routing the gas adjacent the second outer surface comprises deflecting the gas radially outward via a deflector surface of the first outer surface, and redirecting the gas radially inward over the second outer surface of the contact tip. In some examples, the gas is redirected radially inward via a tip-retention device. In some examples, the second outer surface of the contact tip is retained within the tip-retention device.

Some examples of the present disclosure relate to welding systems that provide cooling gas flow to contact tips. The contact tip may be retained within a neck and nozzle assembly of a welding torch that receives gas, such as shielding gas, for example, from the welding system. More particularly, the contact tip may be retained within the neck and nozzle assembly using a tip-retention device and a gas diffuser. The tip retention-device and gas diffuser may cooperate to retain the contact tip. The gas diffuser may have axial gas channels configured to direct the shielding gas over and/or across the rear portion of the contact tip seated within the gas diffuser. The tip retention device may have gas channels configured to guide gas flow from the gas diffuser over and/or across a forward portion of the contact tip. The gas flow cools the contact tip before, during, and/or after welding, which may extend the functional life of the contact tip.

FIG. 1 shows an example of a welding-type system 10. While the specific welding-type system 10 of FIG. 1 is a gas metal arc welding (GMAW) system, other types of welding-type systems may be used. FIG. 1 illustrates the welding-type system 10 as including a welding-type power source 12 coupled to a wire feeder 14, though, in some examples, the wire feeder 14 may be removed from the system 10. In the example of FIG. 1, the power source 12 supplies welding-type power to a torch 16 through the wire feeder 14. In some examples, the power source 12 may supply welding-type power directly to the torch 16 rather than through the wire feeder 14. In the example of FIG. 1, the wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. An operator may engage a trigger 22 of the torch 16 to initiate an arc 24 between the electrode 18 and a work piece 26. In some examples, engaging the trigger 22 of the torch 16 may initiate a different welding-type function, instead of an arc 24.

In some examples, the welding system 10 may receive weld settings from the operator via an operator interface 28 provided on the power source 12 (and/or power source housing). The weld settings may be communicated to control circuitry 30 within the power source 12 that controls generation of welding-type power for carrying out the desired welding-type operation. In the example of FIG. 1, the control circuitry 30 is coupled to the power conversion circuitry 32, which may supply the welding-type power (e.g., pulsed waveform) that is applied to the torch 16. In the example of FIG. 1, the power conversion circuitry 32 is coupled to a source of electrical power as indicated by arrow 34. The source may be a power grid, an engine-driven generator, batteries, fuel cells or other alternative sources.

In some examples, the control circuitry 30 may control the current and/or the voltage of the welding-type power supplied to the torch 16. The control circuitry 30 may monitor the current and/or voltage of the arc 24 based at least in part on one or more sensors 36 within the wire feeder 14 and/or torch 16. In some examples, a processor 35 of the control circuitry 30 may determine and/or control the arc length or electrode extension based at least in part on feedback from the sensors 36. The processor 35 may determine and/or control the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30.

Figure 2:
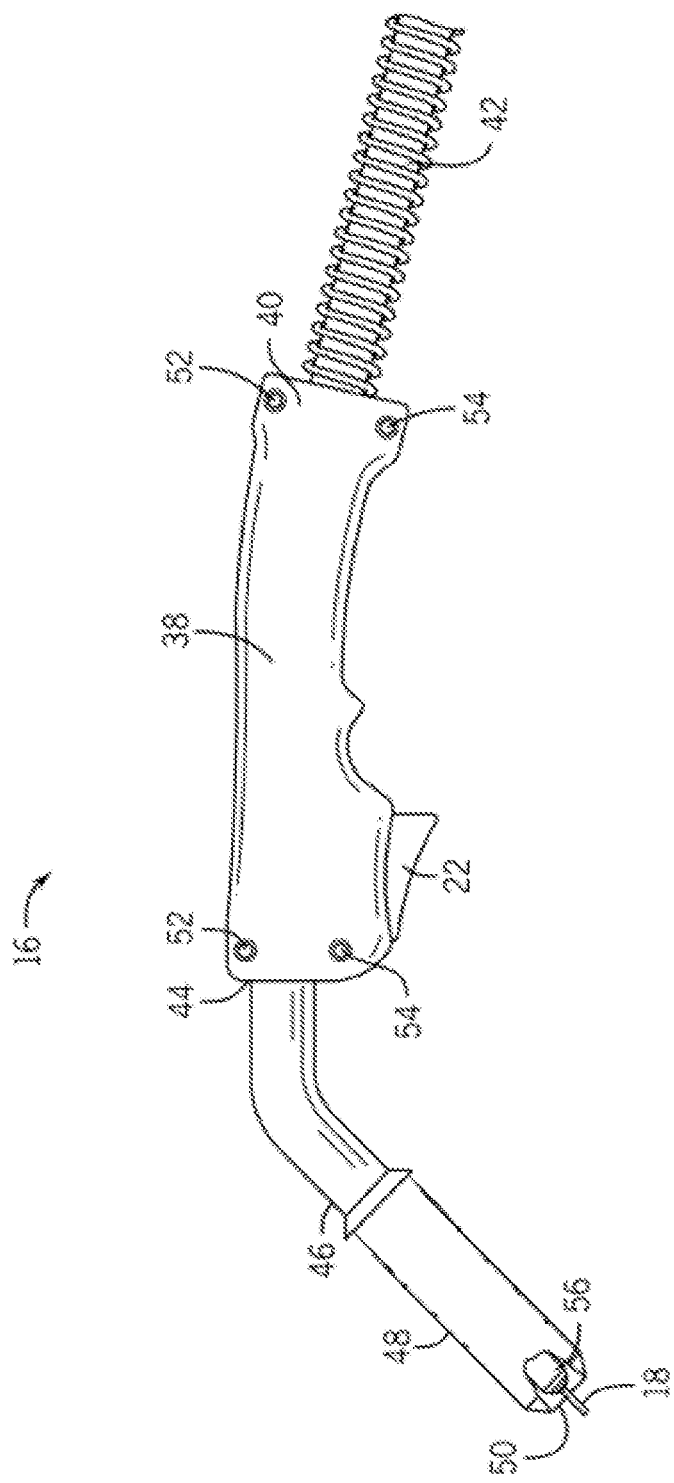
FIG. 2 is a side view of an example welding torch used the welding system of FIG. 1, in accordance with aspects of this disclosure.

FIG. 2 is an example welding torch 16 that may be used in and/or with the example welding system of FIG. 1. The torch 16 includes a handle 38 attached to a trigger 22. The trigger 22 may be actuated to initiate a weld (and/or other welding-type operation). At a rear end 40, the handle 38 is coupled to a cable 42 where welding consumables (e.g., the electrode 18, the shielding gas, and so forth) are supplied to the weld. Welding consumables generally travel through the rear end 40 of the handle 38 and exit at a front end 44, which is disposed on the handle 38 at an end opposite from the rear end 40.

In the example of FIG. 2, the torch 16 includes a neck 46 (e.g., a gooseneck) extending out of the front end 44 of the handle 38. As such, the neck 46 is coupled between the handle 38 and a welding nozzle 48. As should be noted, when the trigger 22 is pressed or actuated, welding wire (e.g., electrode 18) travels through the cable 42, the handle 38, the neck 46, and the welding nozzle 48, so that the welding wire extends out of the front end 50 (i.e., torch tip) of the welding nozzle 48. Shielding gas may also travel through the cable 42, the handle 38, the neck 46, and/or the welding nozzle 48.

In the example of FIG. 2, the handle 38 is secured to the neck 46 via fasteners 52 and 54, and to the cable 42 via fasteners 52 and 54. In some examples, the handle 38 may be secured to the neck 46 using other methods and/or arrangements. The welding nozzle 48 is illustrated with a portion of the welding nozzle 48 removed to show the electrode 18 extending out of a contact tip 56 that is disposed within the welding nozzle 48. While the example torch 16 illustrated in FIG. 2 is designed for welding by a human operator, one or more torches designed for use by a robotic welding system may alternatively, or additionally, be used with the welding system of FIG. 1. For example, the torch 16 may be modified to omit the trigger 22, may be adapted for water cooling, etc.

Figure 3A:
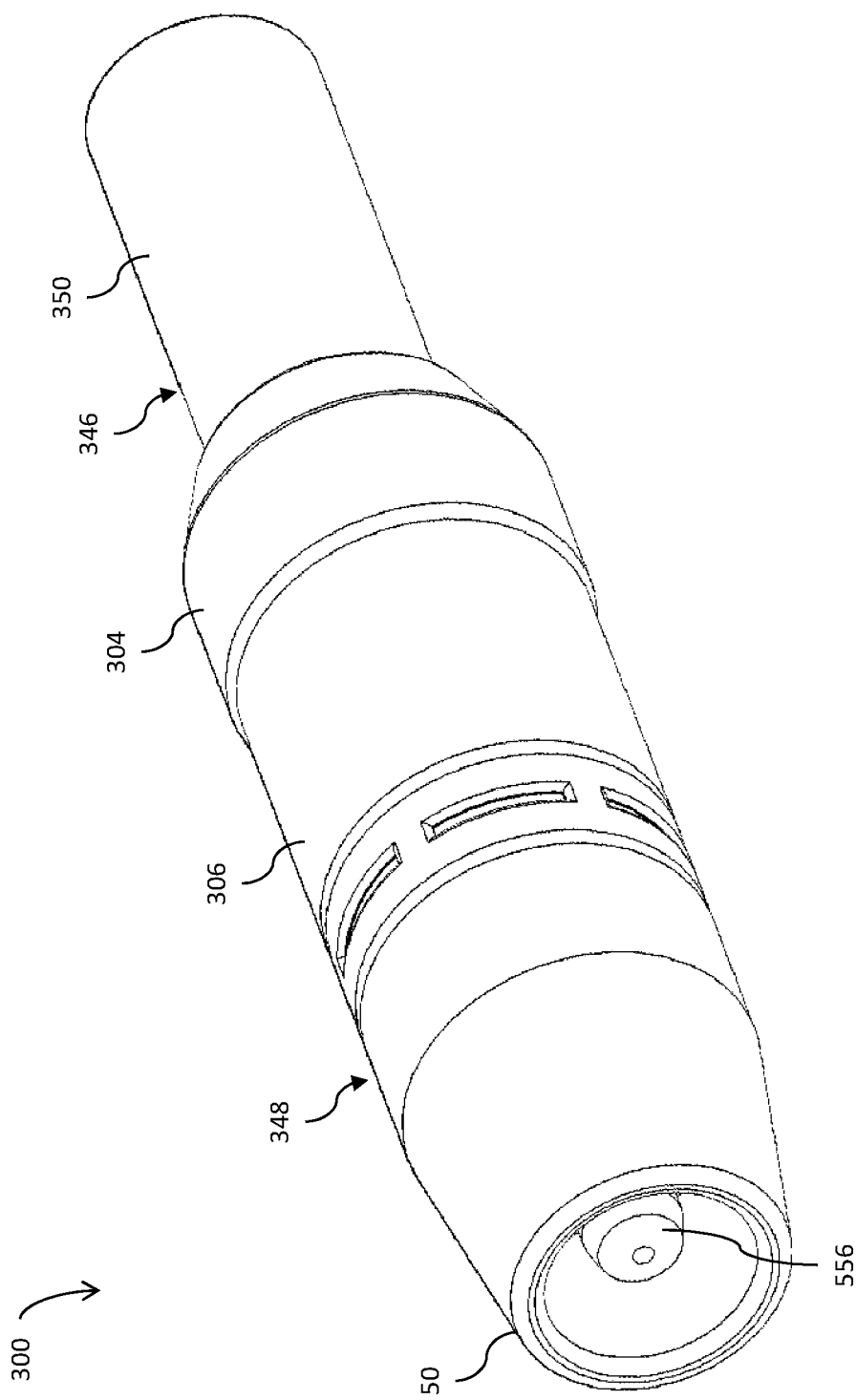
FIG. 3A is a perspective view of an example neck and nozzle assembly that may be used in the example welding torch of FIG. 2, in accordance with aspects of this disclosure.
Figure 3B:
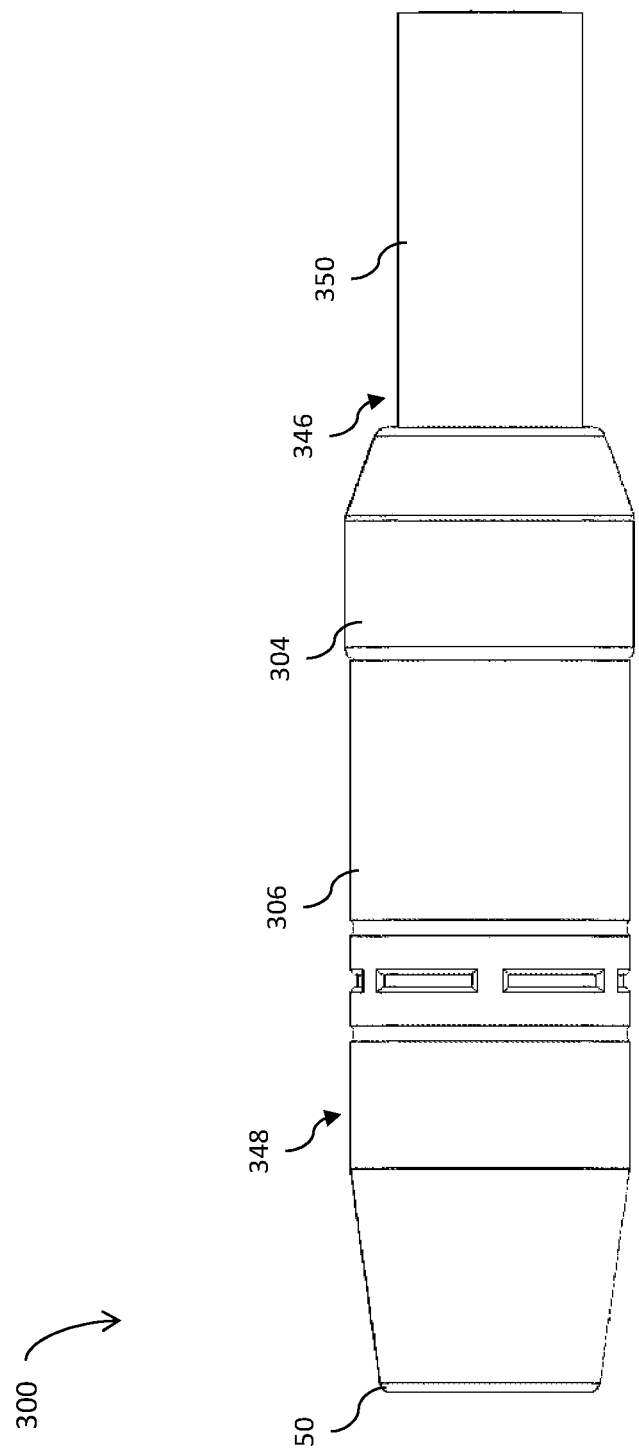
FIG. 3B is a side view of the example neck and nozzle assembly of FIG. 3A, in accordance with aspects of this disclosure.
Figure 4A:
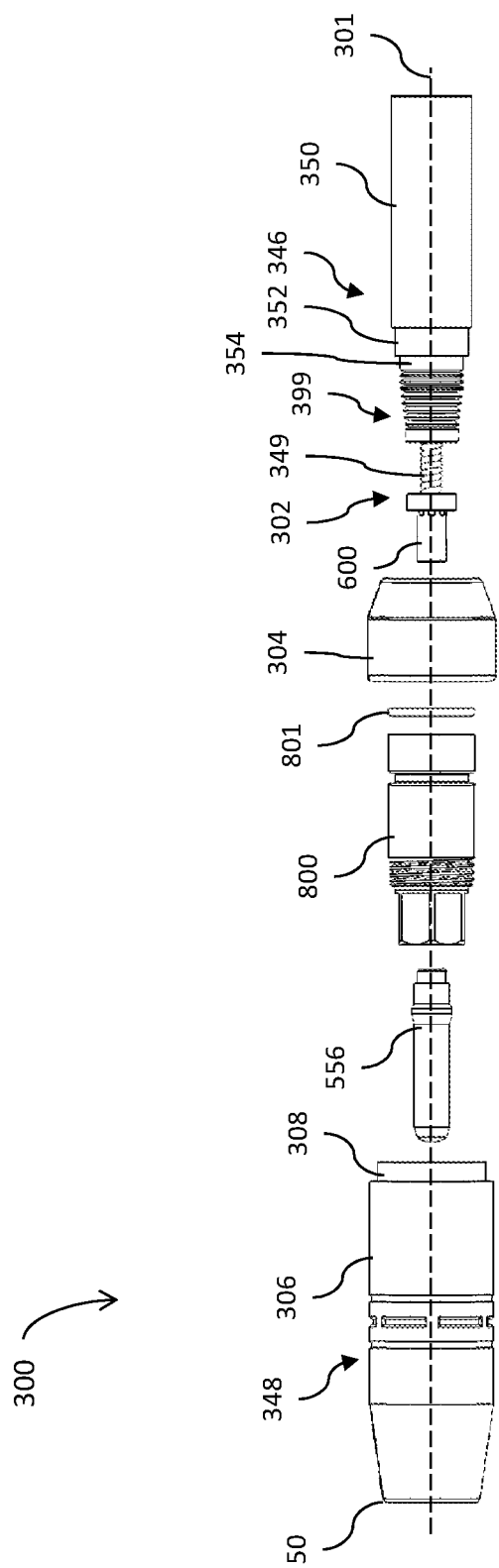
FIG. 4A is an exploded view of the example neck and nozzle assembly of FIG. 3A, in accordance with aspects of this disclosure.

FIGS. 3A and 3B show an example neck and nozzle assembly 300 that may be used with the welding torch 16 of FIG. 2, and/or welding-type system 10 of FIG. 1. In the example of FIGS. 3A and 3B, the neck and nozzle assembly 300 includes a nozzle assembly 348, an insulator cap 304 (e.g., an electrical insulator cap), a contact tip 556, and a neck assembly 346 (e.g., a MIG and/or GMAW welding neck assembly). FIG. 4A shows an exploded view of the example neck and nozzle assembly 300 of FIGS. 3A and 3B. As shown in the example of FIG. 4A, the neck and nozzle assembly 300 further includes a gas diffuser 800 having an O-ring 801. In the example of FIG. 4A, the components of the neck and nozzle assembly 300 are centered (and/or coaxially arranged) about (and/or around, along, etc.) a longitudinal axis 301.

FIG. 4A also shows a liner assembly 302, which, in some examples, may be considered part of the neck assembly 346 or its own separate assembly. As shown, the liner assembly 302 includes a liner coil 349 and a liner lock 600 attached to a front end of the liner coil 349 The liner assembly 302 provides a conduit through which the electrode 18 may travel from the torch handle 38 to the contact tip 556.

Figure 4B:
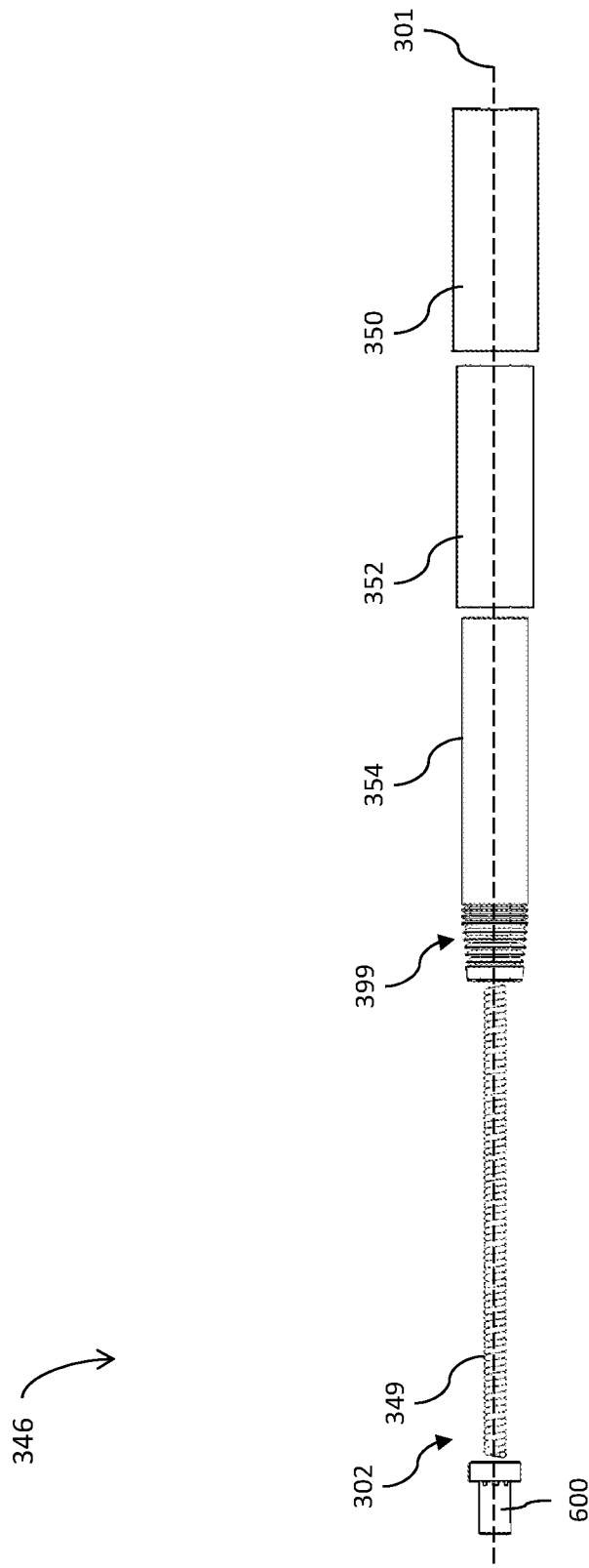
FIG. 4B is an exploded view of an example neck assembly of the neck and nozzle assembly of FIG. 4A, in accordance with aspects of this disclosure.

FIG. 4B shows an exploded view of the example neck assembly 346. In the example of FIG. 4B, the neck assembly 346 includes an outer neck armor 350, a neck insulation 352 (e.g., electrical neck insulation), a neck inner portion 354 (e.g., an electrically conductive neck inner portion), and a liner assembly 302 having a liner lock 600. In the example of FIG. 4B, the outer neck armor 350, neck insulation 352, and neck inner portion 354 are generally cylindrical and hollow, with cylindrical bores centered about the axis 301 extending through the components.

The neck inner portion 354 may be comprised of an electrically conductive material. In the example of FIGS. 4A and 4B, the neck inner portion 354 includes screw threads 399 configured for coupling to complementary interior screw threads 899 of the gas diffuser 800. In some examples, the neck inner portion 354 and gas diffuser 800 may be coupled together using other mechanisms and/or methods, besides screw threads. The neck insulation 352 provides electrical (and/or thermal) insulation between the neck inner portion 354 and the outer neck armor 350, and may be formed of an electrically insulating material. The outer neck armor 350, neck insulation 352, neck inner portion 354, and liner assembly 302 include a bore extending through their centers. The bore is centered along longitudinal axis 301. When the neck assembly 346 is fully assembled, the liner coil 349 is positioned within the bore of the neck inner portion 354, the neck inner portion 354 is positioned within the bore of the neck insulation 352, and the neck insulation 352 is positioned within the bore of the outer neck armor 350.

Figure 4C:
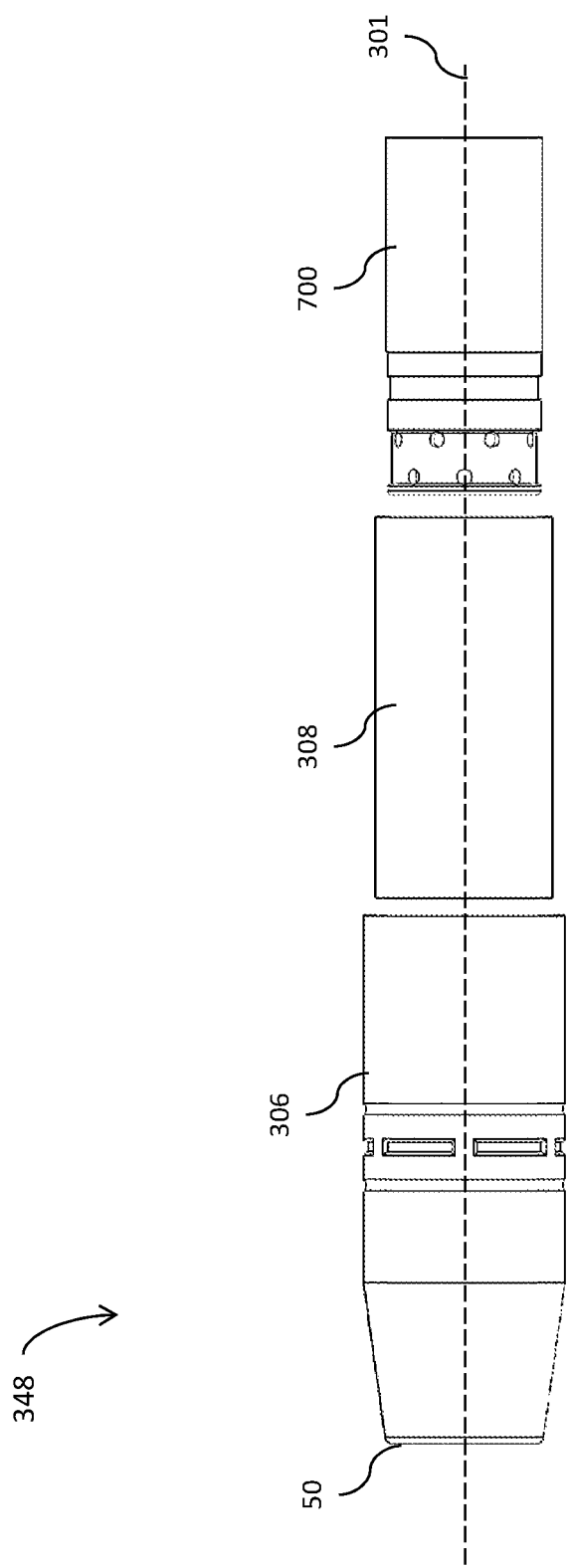
FIG. 4C is an exploded view of an example nozzle assembly of the neck and nozzle assembly of FIG. 4A, in accordance with aspects of this disclosure.

FIG. 4C shows an exploded view of the example nozzle assembly 348. As shown, the nozzle assembly 348 includes a nozzle body 306, a nozzle insulator 308 (e.g., a nozzle electrical insulator), and a tip-retention device 700 (e.g., a nozzle insert). The tip-retention device 700 helps to retain the contact tip 556 within the nozzle assembly 348. The nozzle insulator 308 provides electrical (and/or thermal) insulation within the nozzle assembly 348, and may be formed of an electrically insulating material. In the example of FIG. 4C, the nozzle body 306 and nozzle insulator 308 are generally cylindrical. The nozzle body 306, nozzle insulator 308, and tip-retention device 700 include a bore centered about longitudinal axis 301. When the nozzle assembly 348 is assembled, the tip-retention device 700 is positioned within the nozzle insulator 308, and the nozzle insulator 308 is positioned within the nozzle body 306.

Figure 5:
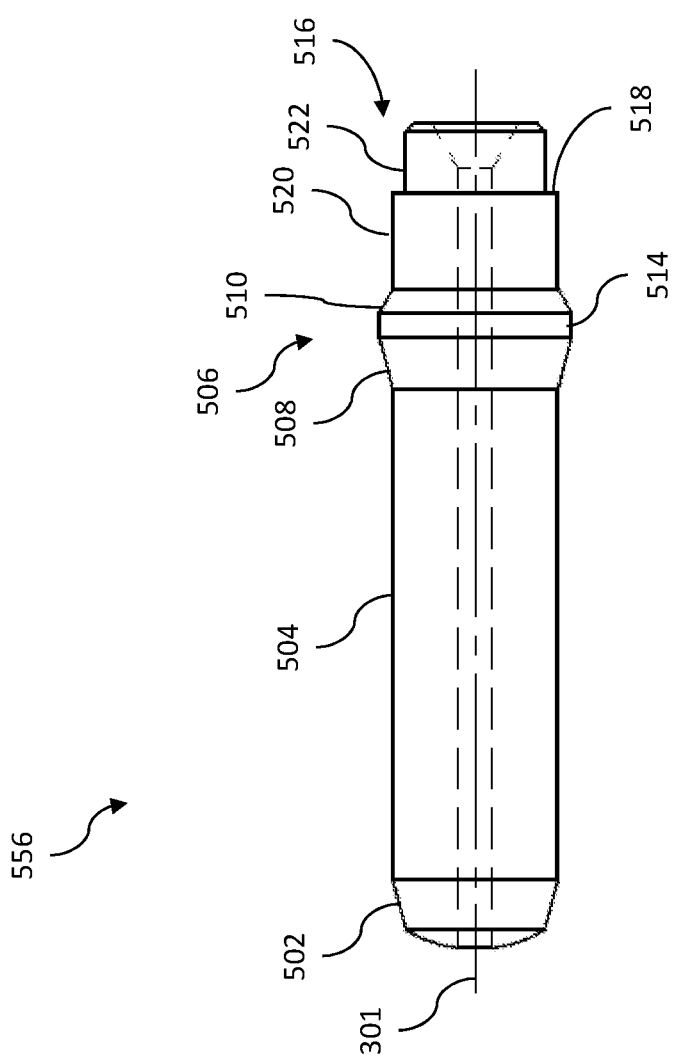
FIG. 5 is a side view of an example contact tip of the neck and nozzle assembly of FIG. 4A, in accordance with aspects of this disclosure.

FIG. 5 shows a side view of the contact tip 556. The contact tip 556 may be threaded or threadless. If threadless, no tool may be necessary to insert the contact tip 556 into the nozzle/gas diffuser assembly, for example. In some examples, the contact tip 556 can be secured with the use of a tool. As shown, the contact tip 556 includes an internal bore through which an electrode 18, for example, may move and/or extend. The bore may be centered about the longitudinal axis 301.

In the example of FIG. 5, the contact tip 556 is generally cylindrical. As shown, the contact tip 556 includes a front portion 502, a middle portion 504, and a rear portion 506. When assembled into the neck and nozzle assembly 300, the front portion 502 of the contact tip 556 may be closest to the welding arc 24. In the example of FIG. 5, the middle portion 504 is directly behind the front portion 502, and is generally tubular (and/or cylindrical). A portion of the middle portion 504 may be positioned within the tip-retention device 700 and/or nozzle insulator 308 when the contact tip 556 is assembled into the neck and nozzle assembly 300.

In the example of FIG. 5, the rear portion 506 of the contact tip 556 is positioned directly behind the middle portion 504. In some examples, the rear portion 506 may be positioned within the gas diffuser 800 and/or tip-retention device 700 when the contact tip 556 is assembled into the neck and nozzle assembly 300. As shown, the rear portion 506 comprises a forward taper 508, a deflector portion 510 (and/or rear taper), and a stepped profile 516.

In the example of FIG. 5, the forward taper 508 expands an outer diameter of the contact tip 556 as it extends rearward from the middle portion 504. In some examples, the forward taper 508 may be configured to interface with the nozzle assembly 348 (e.g., with a taper 708 of a tip-retention wall 706 of the tip-retention device 700 of the nozzle assembly 348) when the contact tip 556 is assembled into the neck and nozzle assembly 300. The forward taper 508 may be, for example, a forward-facing locking taper.

In the example of FIG. 5, the deflector surface 510 (and/or rear taper) is positioned to the rear of the forward taper 508. The contact tip 556 includes a connecting portion 514, extending generally parallel to the axis 301, between the forward taper 508 and deflector surface 510. The deflector surface 510 reduces the outer diameter of the contact tip 556 as it extends rearward from the connecting portion 514. In some examples, the deflector surface 510 may be configured to guide gas flow when the contact tip 556 is assembled into the neck and nozzle assembly 300.

In the example of FIG. 5, the contact tip 556 also includes a profile 516 (e.g., a stepped profile or other type of profile) disposed at the rear of the contact tip 556, directly behind the deflector surface 510. As shown in the example of FIG. 5, the profile 516 includes an L shaped shoulder 518 (and/or step) formed at a right angle between a first portion 520 and second portion 522 of the profile 516. In a three-dimensional view, the shoulder 518 may appear more annular. The shoulder 518 is positioned at an orthogonal transition of the contact tip 556, where the outer diameter of the contact tip 556 is further reduced.

In some examples, the profile 516 may be configured to interface with the gas diffuser 800. For example, the profile 516 (and/or shoulder 518 of the profile 516) may interface with a seat of the gas diffuser 800 to receive the contact tip 556 within the gas diffuser 800 when the contact tip 556 is assembled into the neck and nozzle assembly 300. In some examples, the profile 516 may be configured to align with the liner assembly 302, liner lock 600, and/or liner coil 349 when the contact tip 556 is assembled into the neck and nozzle assembly 300. In some examples, the deflector surface 510 and the profile 516 form a turned down portion of the rear outer surface of the contact tip 556 that provides surface area for cooling. In some examples, the shape of the deflector surface 510 and/or the profile 516 may be configured to maximize or increase a cooling effect on the contact tip 556 as shielding gas flows over the rear outer surface of the contact tip 556.

Figure 6:
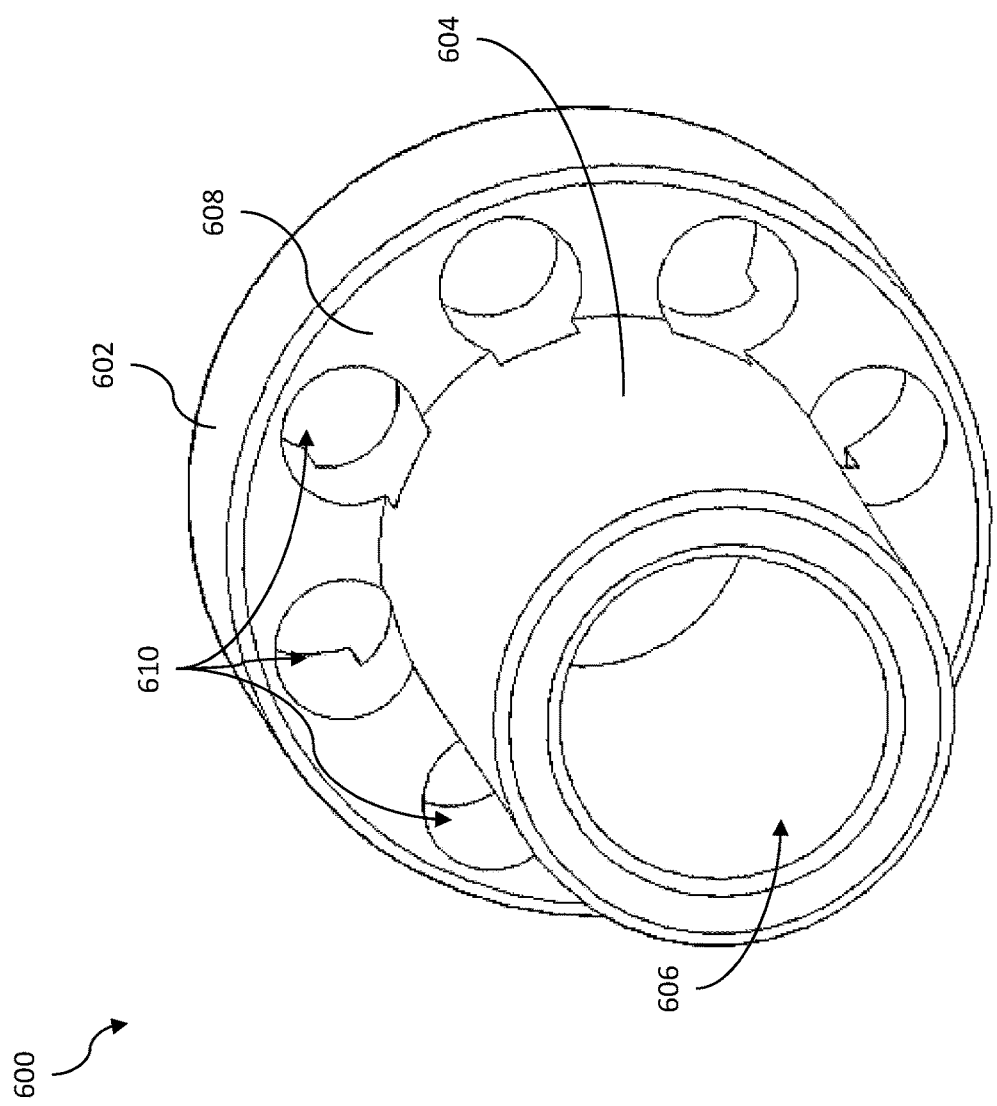
FIG. 6 is a front perspective view of an example liner stop of the neck and nozzle assembly of FIG. 4A, in accordance with aspects of this disclosure.

FIG. 6 shows a front perspective view of the liner lock 600. The liner lock 600 may be attached to an end of the liner coil 349. In some examples, the liner lock 600 may be larger in diameter than an internal bore of the neck inner portion 354 such that the liner lock 600 prevents the liner assembly 302 from retracting (e.g., axially toward a rear portion of the welding torch 16) into the neck inner portion 354. In some examples, the gas diffuser 800 may be configured internally to interact with the liner lock 600, liner coil 349, and/or liner assembly 302, such that the liner coil 349 may not abut, reside within, nor be in any physical contact with the rear end of the contact tip 556. As such, the installation and removal of the contact tip 556 may be made easier in that the liner assembly 302 may not exert any axial or counter-rotational forces against the contact tip 556. In some examples, the gas diffuser 800 may also be configured internally to interact with the liner lock 600 such that the liner assembly 302 maintains better concentricity between the liner assembly 302 and the contact tip 556. Indeed, in some examples, the liner lock 600 may be integral to the gas diffuser 800. In other words, the features of the liner lock 600, as described herein, may be part of the gas diffuser 800 in examples where the liner lock 600 and the gas diffuser 800 are integrated into a single component.

In the example of FIG. 6, the liner lock 600 includes a main body 602 and a nose 604. Both the nose 604 and main body 602 are generally cylindrical. When assembled into the neck and nozzle assembly 300, the main body 602 and/or nose may be centered about longitudinal axis 301. As shown, the outer diameter of the main body 602 is larger than the outer diameter of the nose 604. A bore 606 (e.g., centered about longitudinal axis 301) extends through the nose 604 (and/or main body 602). In the example of FIG. 6, the liner lock 600 includes a liner lock shoulder 608 formed at a generally orthogonal transition between the main body 602 and the nose 604. In some examples, the liner lock shoulder 608 may be configured to interact with (and/or abut, interface with, engage with, etc.) a complementary shoulder 808 of the gas diffuser 800, when the liner lock 600 is assembled into the neck and nozzle assembly 300. In the example of FIG. 6, the main body 602 includes several ports 610 ringed around the nose 604. When the liner lock 600 is assembled into the neck and nozzle assembly 300, the ports 610 may provide a passageway through which gas may flow (e.g., between the contact tip 556 and the gas diffuser 800).

Figure 7A:
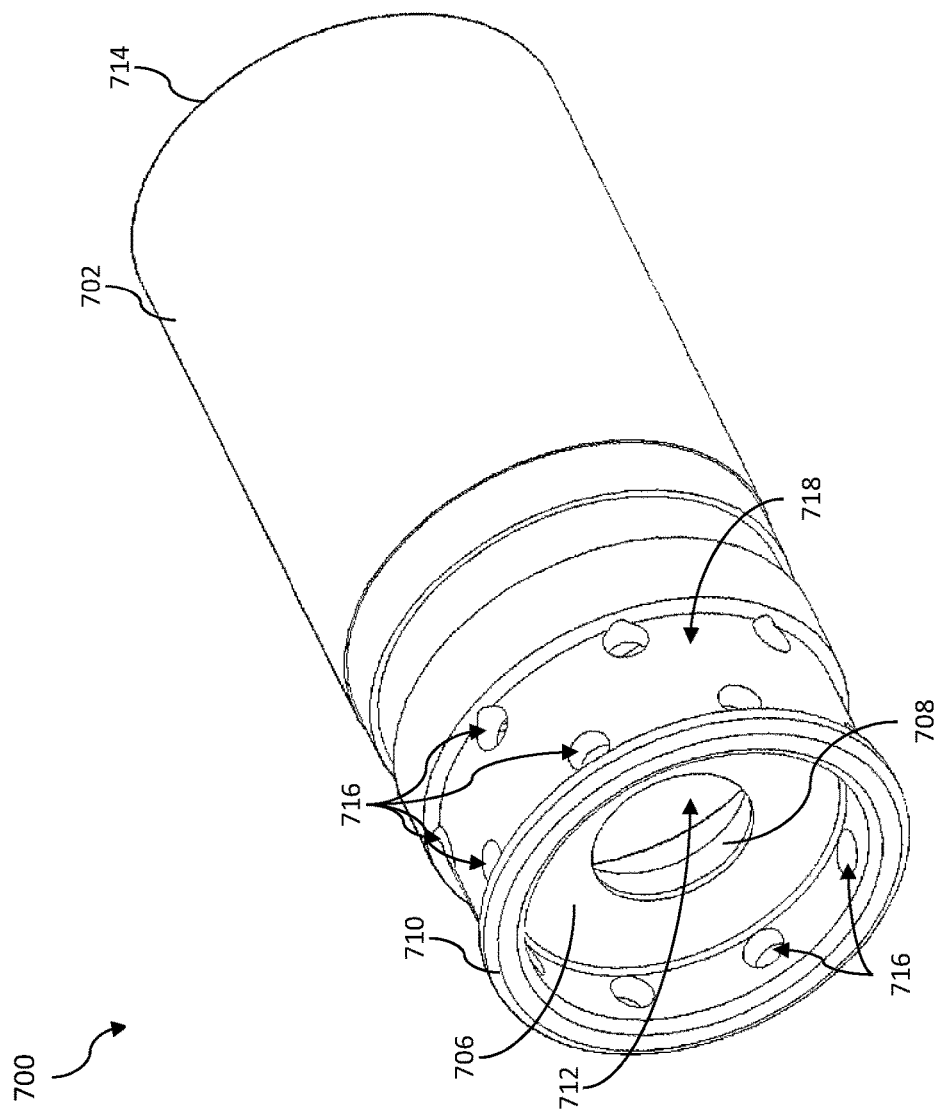
FIG. 7A is a front perspective view of an example tip-retention device of the nozzle assembly of FIG. 4C, in accordance with aspects of this disclosure.
Figure 7B:
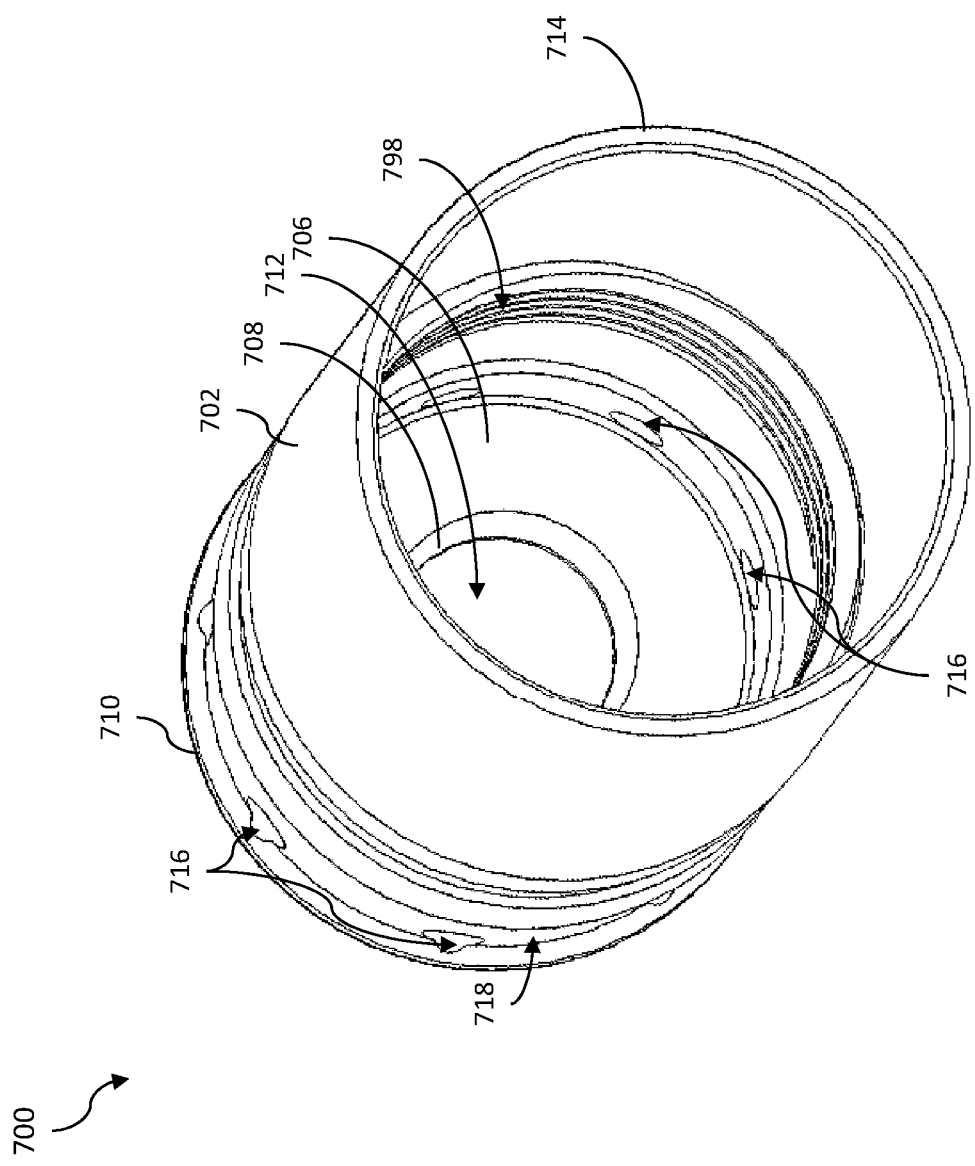
FIG. 7B is a rear perspective view of the example tip-retention device of FIG. 7A, in accordance with aspects of this disclosure.
Figure 8A:
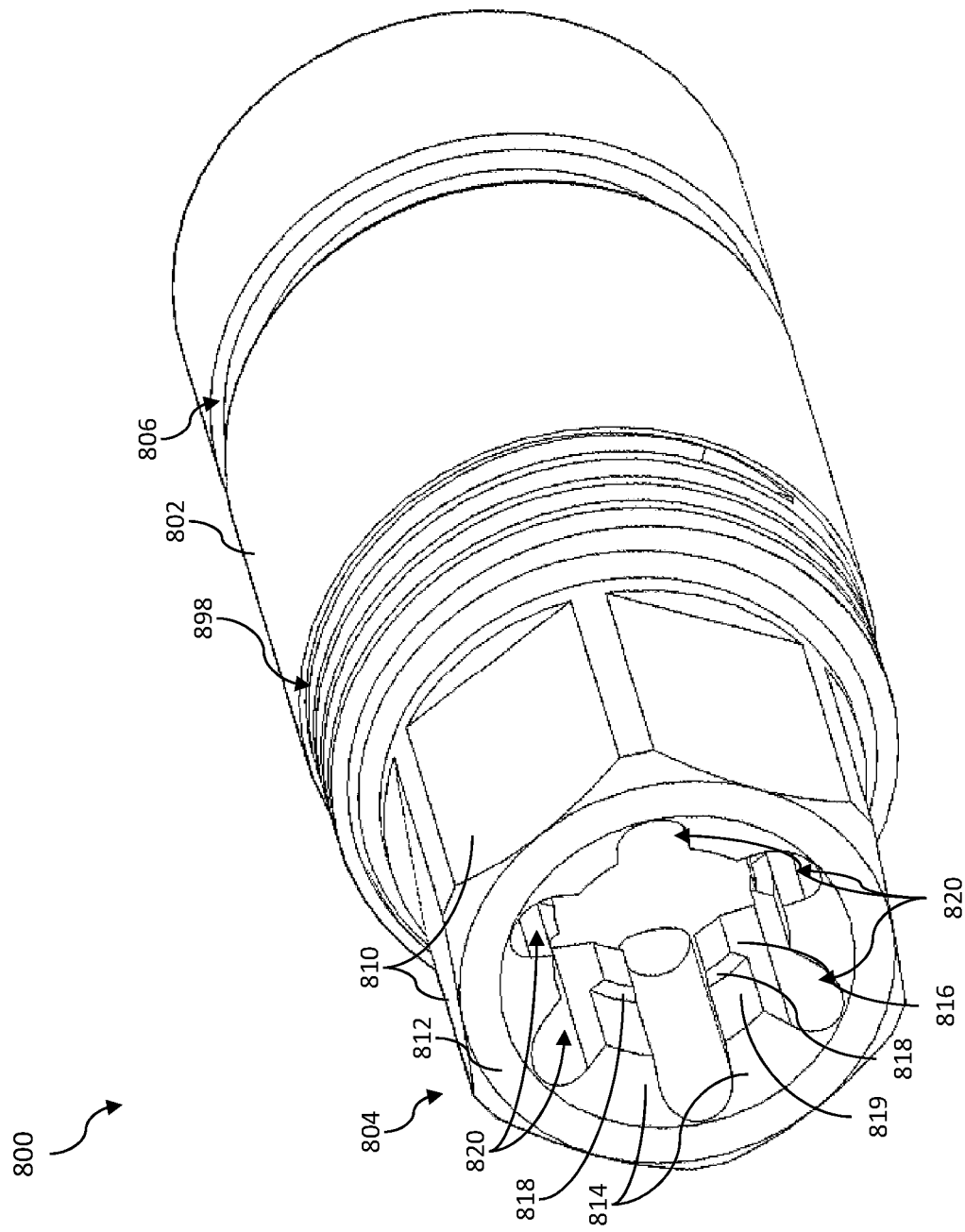
FIG. 8A is a front perspective view of an example gas diffuser of the neck and nozzle assembly of FIG. 4A, in accordance with aspects of this disclosure.
Figure 8B:
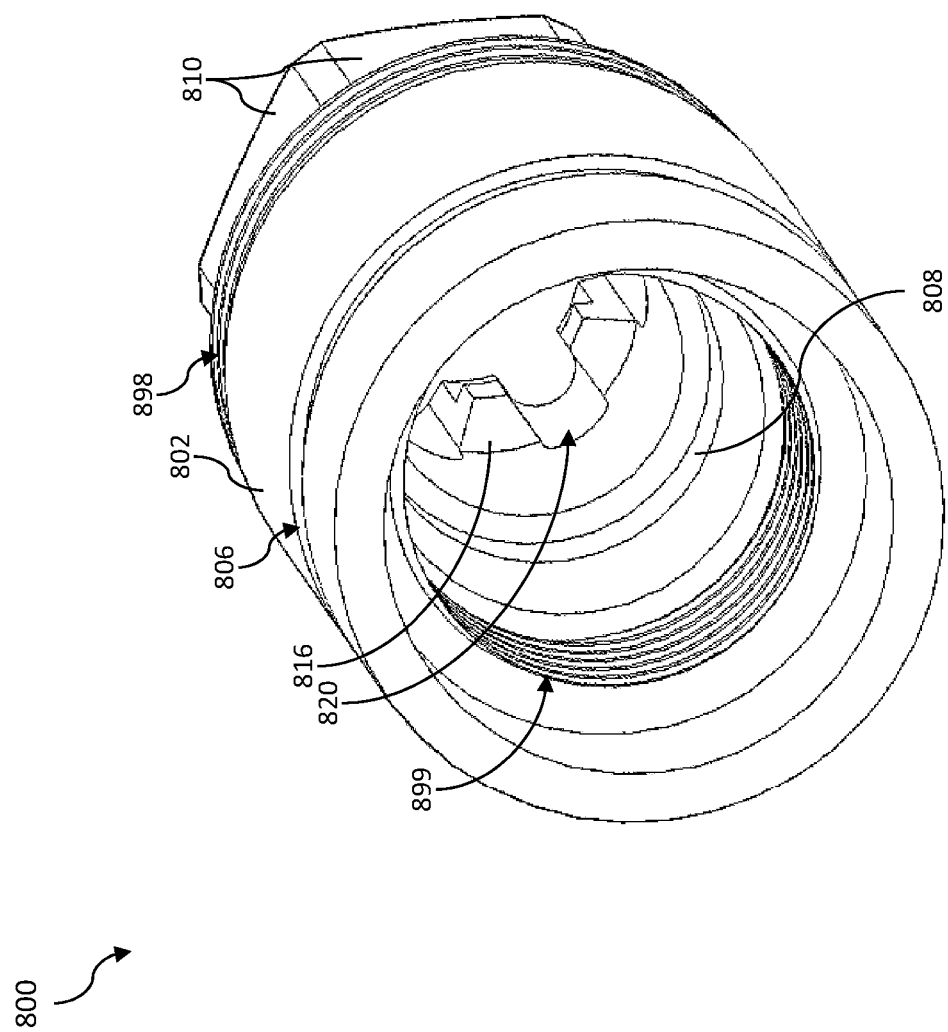
FIG. 8B is a rear perspective view of the example gas diffuser of FIG. 8A, in accordance with aspects of this disclosure.
Figure 8D:
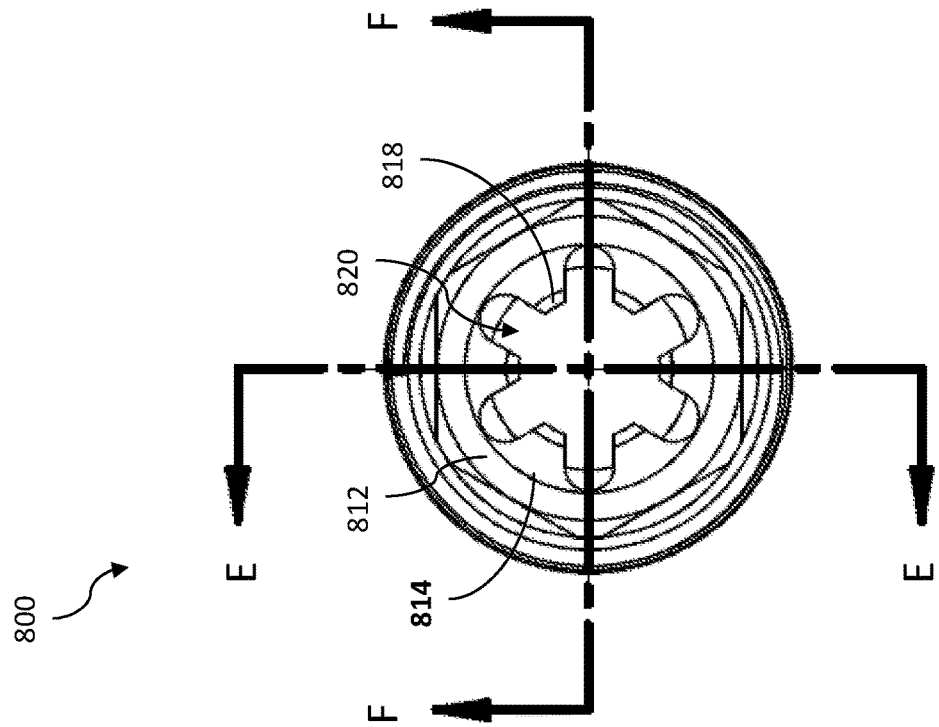
FIG. 8D is a front end view of the example gas diffuser of FIG. 8A, in accordance with aspects of this disclosure.
Figure 8C:
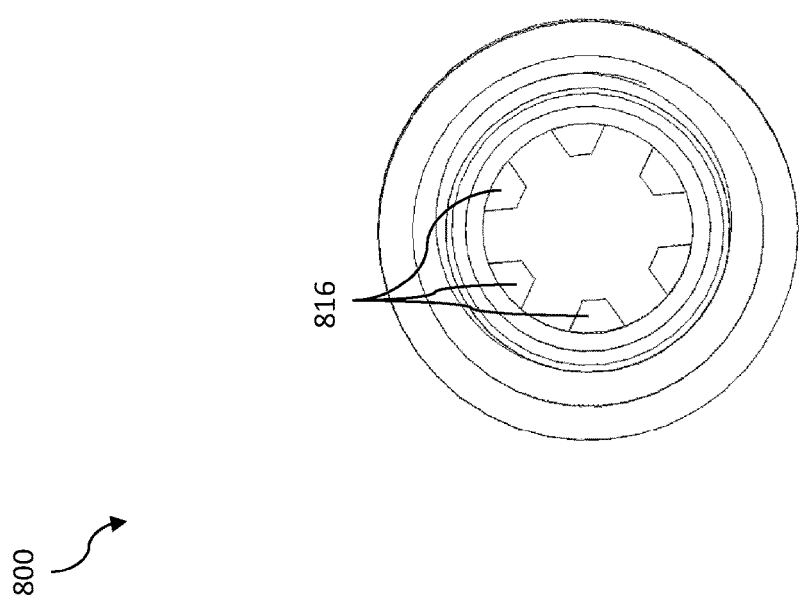
FIG. 8C is a rear end view of the example gas diffuser of FIG. 8A, in accordance with aspects of this disclosure.
Figure 8E:
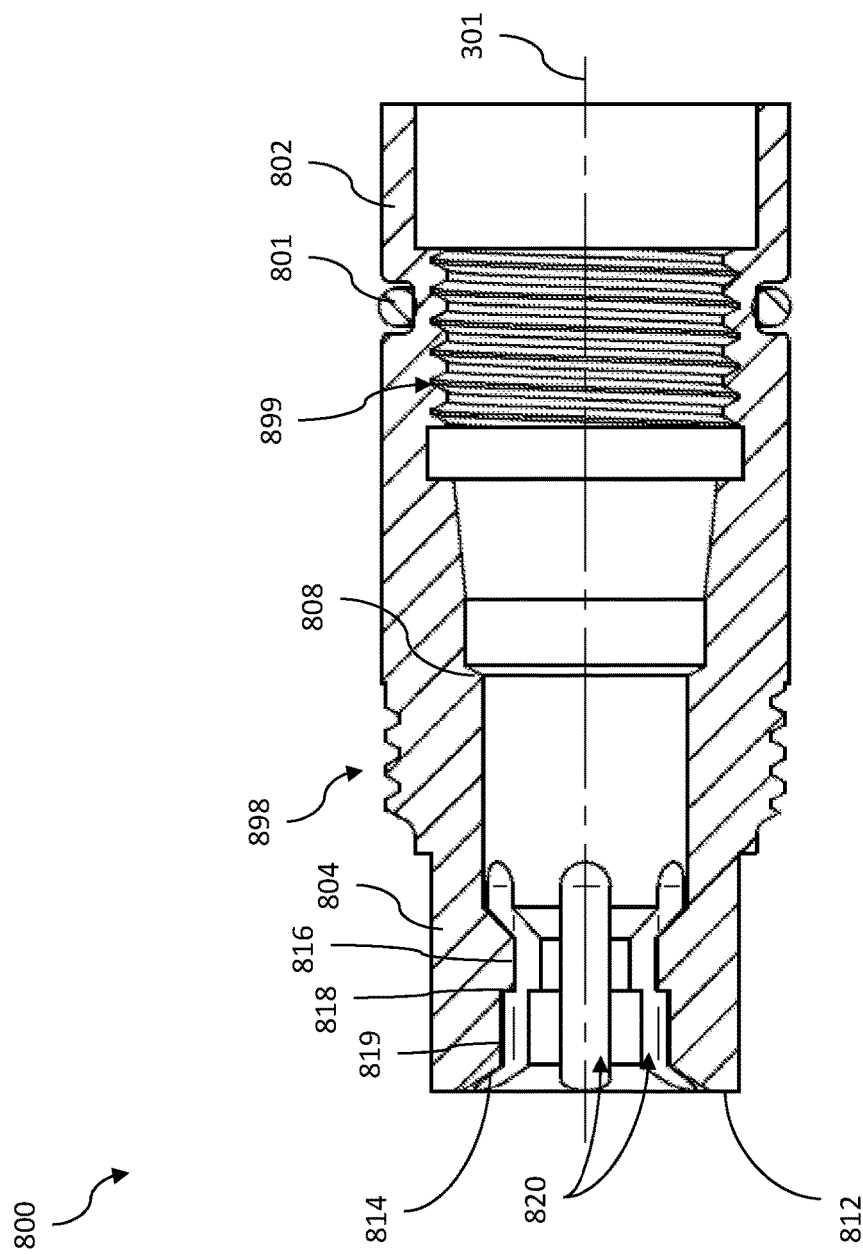
FIG. 8E is a cross-sectional view of the example gas diffuser of FIG. 8A along line E-E of FIG. 8D, in accordance with aspects of this disclosure.
Figure 8F:
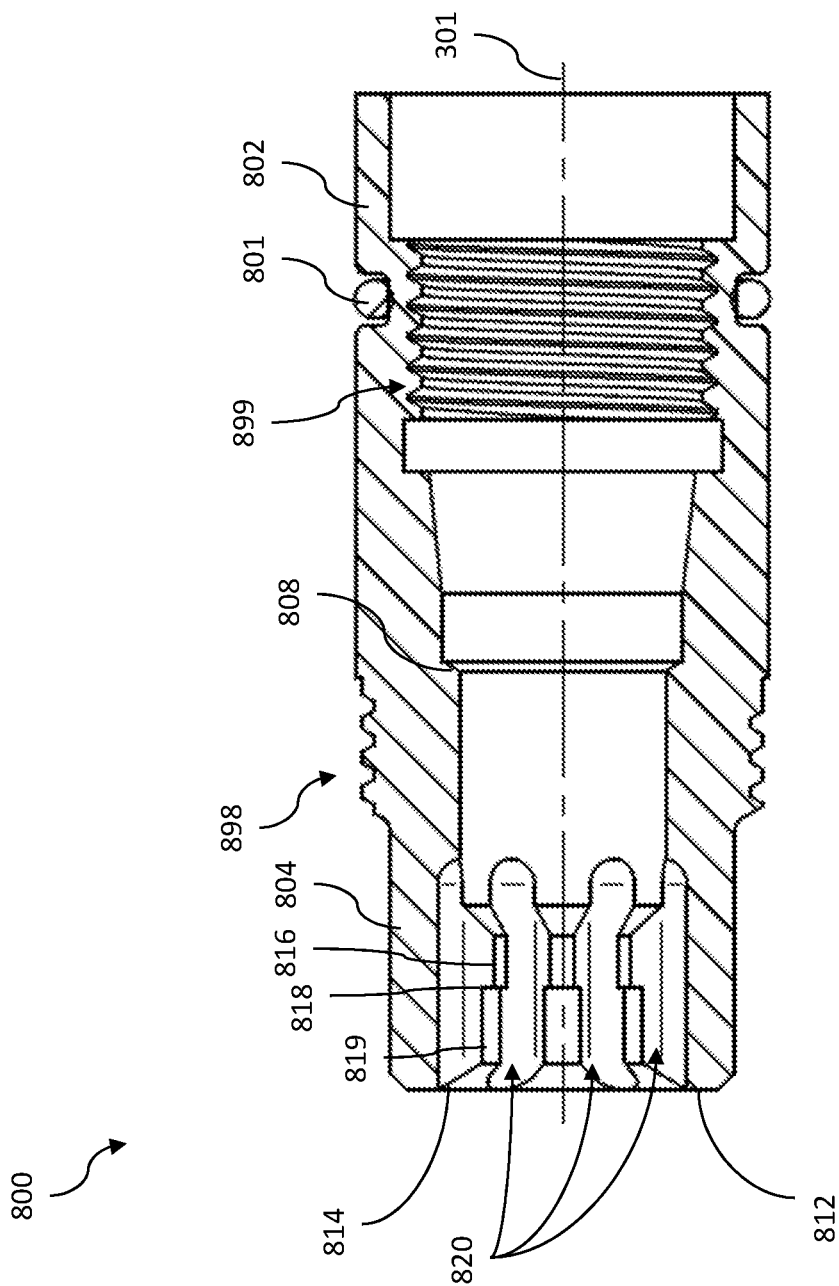
FIG. 8F is a cross-sectional view of the example gas diffuser of FIG. 8A along line F-F of FIG. 8D, in accordance with aspects of this disclosure.

FIGS. 7A and 7B show front and rear perspective views of the tip-retention device 700. In some examples, the tip-retention device 700 may be configured to retain the contact tip 556 within the nozzle assembly 348. In some examples, the tip-retention device 700 may be, for example, a nozzle insert or addition that is crimped into or outside of the nozzle body 306. In some examples, the tip-retention device 700 may be an integral part of the nozzle body 306 and/or other portions of the nozzle assembly 348.

As shown, the tip-retention device 700 is approximately cylindrical, though in some examples the tip-retention device 700 may be shaped differently to accommodate the shape of the nozzle assembly 348. In the example of FIGS. 7A and 7B, the tip-retention device 700 includes an approximately cylindrical sidewall 702. The sidewall 702 surrounds a generally hollow interior. The outer diameter of the sidewall 702 may be sized so as to frictionally engage with the nozzle insulator 308 when the tip-retention device 700 is within the nozzle insulator 308. As shown in the example of FIGS. 7A and 7B, the interior of the sidewall 702 may be formed with threads 798 configured to engage (and/or couple) with complementary threads 898 of the gas diffuser 800. In some examples, the tip-retention device 700 may include alternative and/or additional mechanisms and/or surfaces for engagement with the gas diffuser 800.

A tip-retention wall 706 extends from the sidewall 702 into the interior of the tip-retention device 700, proximate a leading edge 710 of the tip-retention device 700. The tip-retention wall 706 includes a bore 712 configured to fit the contact tip 556. The tip-retention wall 706 further includes a locking taper 708 on the portion of the tip-retention wall 706 immediately surrounding the bore 712. The locking taper 708 is configured to engage a matching forward locking taper 508 (e.g., a forward-facing locking taper) of the contact tip 556. More particularly, the locking taper 708 of the tip-retention wall 706 may be configured to abut and/or engage the locking taper 508 of the contact tip 556, so as to retain the contact tip 556 within the bore 712 of the tip-retention device 700. In some examples, the engagement may also maintain concentricity and conductivity. Because of the locking taper 708, the bore 712 has a smaller circumference (and/or radius, diameter, size, etc.) on one side of the tip-retention wall 706 than on the other side. More particularly, the bore 712 has a smaller circumference (and/or radius, diameter, size, etc.) on the side of the tip-retention wall 706 closest to the leading edge 710 of the tip-retention device 700. The bore 712 has a larger circumference (and/or radius, diameter, size, etc.) on the opposite side of the tip-retention wall 706, closer to a rear edge 714 of the tip-retention device 700.

In the examples of FIGS. 7A and 7B, the tip-retention device 700 further includes gas holes 716 on front and rear sides of the tip-retention wall 706. As shown, the gas holes 716 are positioned on the sidewall 702, radially around the tip-retention device 700. The gas holes 716 are disposed in/on a channel portion 718 of the sidewall 702 that has a smaller outer diameter than the majority of the sidewall 702, so as to provide room for shielding gas to flow between the tip-retention device 700 and the nozzle insulator 308 (and/or other portions of the nozzle assembly 348) when the tip-retention device 700 is assembled with the neck and nozzle assembly 300. In the example of FIGS. 7A and 7B, the gas holes 716 are approximately circular (and/or oval, elliptical, etc.). The gas holes 716 may be configured to provide a route and/or path for shielding gas to flow through the sidewalls 702 (and/or channel portion 718) and around the tip-retention wall 706.

The tip-retention device 700 may be configured to provide clearance for gas flow by providing gas holes 716 through its sidewall 702 to direct gas inwardly towards the contact tip 556. More particularly, gas flow from the gas diffuser 800 may be directed radially outward by the tip-retention wall 706 (and/or contact tip 556 retained by the tip-retention wall 706). The outwardly directed gas may flow through gas holes 716 on the rear side of the tip-retention wall 706, and through the channel portion 718. The nozzle insulator 308 and/or leading edge 710 may then direct the shielding gas radially inward through the gas holes 716 on the front side of the tip-retention wall 706, towards the contact tip 556. The inward gas flow directed at the contact tip 556 may provide a cooling effect on the contact tip 556. The radially facing gas holes 716 (e.g., radial channels) may further resist spatter collection in comparison to forward-facing gas holes (e.g., axial channels).

In some examples, other example tip-retention devices may be used, such as those described in at least U.S. patent application Ser. No. 15/828,041, which is owned by the assignee of this application, and which is incorporated herein by reference.

FIGS. 8A-8F show various views of the gas diffuser 800. The gas diffuser 800 may be electrically conductive. As shown in the examples of FIGS. 8A-8F, the gas diffuser 800 is generally hollow, and includes a generally cylindrical base 802 and a nose 804 connected to the base 802. The base 802 is approximately centered about longitudinal axis 301 when assembled with the neck and nozzle assembly 300. Both the base 802 and the nose 804 encircle the hollow interior. The diameter of the hollow interior is generally larger within the base 802 than within the nose 804.

As shown, an exterior surface of the base 802 includes an annular crevice 806 configured to receive the O-ring 801. The O-ring 801 may be configured to create a gas seal between the gas diffuser 800 and the nozzle insulator 308 (and/or some other part of the nozzle assembly 348) when the O-ring 801 and gas diffuser 800 are assembled into the neck and nozzle assembly 300. In the examples of FIGS. 8A-8F, an interior surface of the base 802 includes a diffuser shoulder 808 configured to abut (and/or engage, interface, etc.) the liner lock shoulder 608, so as to prevent the liner lock 600 from moving further forward within the gas diffuser 800 when the gas diffuser 800 is assembled with the neck and nozzle assembly 300. When full assembled, the nose 604 of the liner lock 600 may extend into the hollow interior of the nose 804 of the gas diffuser 800.

In the examples of FIGS. 8A-8F, the base 802 of the gas diffuser 800 includes outer threads 898 formed on the exterior surface of the base 802, and inner threads 899 formed on the interior surface of the base 802. The outer threads 898 may be configured to mate with (and/or engage, interface with, couple to, etc.) complementary internal threads 798 of the tip-retention device 700. The interior threads 899 may be configured to mate with (and/or engage, interface with, couple to, etc.) complementary external threads 399 of the neck assembly 346. In the example of FIGS. 8A-8F, the nose 804 of the gas diffuser 800 includes wrench flats 810 that may be used, if necessary, to tighten the gas diffuser 800 to the neck assembly 346 via internal threads 899 of the gas diffuser 800 and/or mating external threads 399 of the neck assembly 346. In some examples, the gas diffuser 800, tip-retention device 700, and/or neck assembly 346 may be coupled together using other mechanisms and/or methods besides screw threads (e.g. friction fit).

In the examples of FIGS. 8A-8F, the gas diffuser 800 includes a front rim 812 at the axial end of its nose 804. A chamfered surface 814 extends inwardly from the front rim 812 towards the hollow interior of the gas diffuser 800. In some examples, the chamfered surface 814 may provide clearance for the deflector surface 510 on the contact tip 556. The chamfered surface 814 may also narrow a diameter of the hollow interior of the gas diffuser 800 within the nose 804. As shown, the chamfered surface 814 leads to ledges 819, which connect to teeth 816 through shelves 818.

In the examples of FIGS. 8A-8F, a plurality of teeth 816 extend radially inwards from the interior surface of the nose 804 into the hollow interior of the gas diffuser 800. Each tooth 816 includes a shelf 818 (and/or shoulder), formed at an orthogonal transition between the tooth 816 and a ledge 819. The shelf 818 may abut (and/or engage, interface with, press against, etc.) the shoulder 518 at the rear stepped profile 516 of the contact tip 556 when the contact tip 556 and gas diffuser 800 are assembled into the neck and nozzle assembly 300. The ledge 819, tooth 816, and/or shelf 818 may therefore comprise a complementary stepped profile to the stepped profile 516 of the contact tip 556, and/or a seat configured to receive the contact tip 556 when the contact tip 556 and gas diffuser 800 are assembled into the neck and nozzle assembly 300. When the contact tip 556 and gas diffuser 800 are assembled into the neck and nozzle assembly 300, the contact tip 556 may be retained within the gas diffuser 800, tip-retention device 700, and/or nozzle assembly 348 may a compressive force between the seat of the gas diffuser 800 and the tip-retention wall 706 (and/or taper 708 of the tip-retention wall 706) of the tip-retention device 700.

In the examples of FIGS. 8A-8F, the gas diffuser 800 further includes a plurality of axial gas channels 820 ringed around the interior surface of the nose 804. As shown, the gas channels 820 extend approximately parallel to the longitudinal axis 301. In the examples of FIGS. 8A-8F, each gas channel 820 is positioned between two teeth 816, in a circumferential (and/or arcuate) direction. The interior diameter of the gas diffuser 800 (and/or diameter of hollow interior) is larger at the gas channels 820 than at the teeth 816 and/or ledges 819, and/or the chamfered surface 814. The gas channels 820 extend axially from approximately the front rim 812 past the shelves 818 of the teeth 816. Thus, the gas channels 820 provide conduits (and/or passages) through which gas may flow past (and/or over, across, etc.) the contact tip 556 when the contact tip 556 is received in the of the gas diffuser 800. Further, the liner assembly 302 may prevent gas flowing through the gas diffuser 800 and/or channels 820 from flowing into the interior of the contact tip 556 with the electrode 18. Thus, the gas channels 820 may be configured to direct (and/or guide, steer, etc.) shielding gas over the outside surface (e.g., profile 516, deflector surface 510, etc.) of the contact tip 556 while the contact tip 556 is retained in the seat, which may help to cool the contact tip 556, reduce wear and tear due to high temperatures, and/or extend the life of the contact tip 556.

Figure 9A:
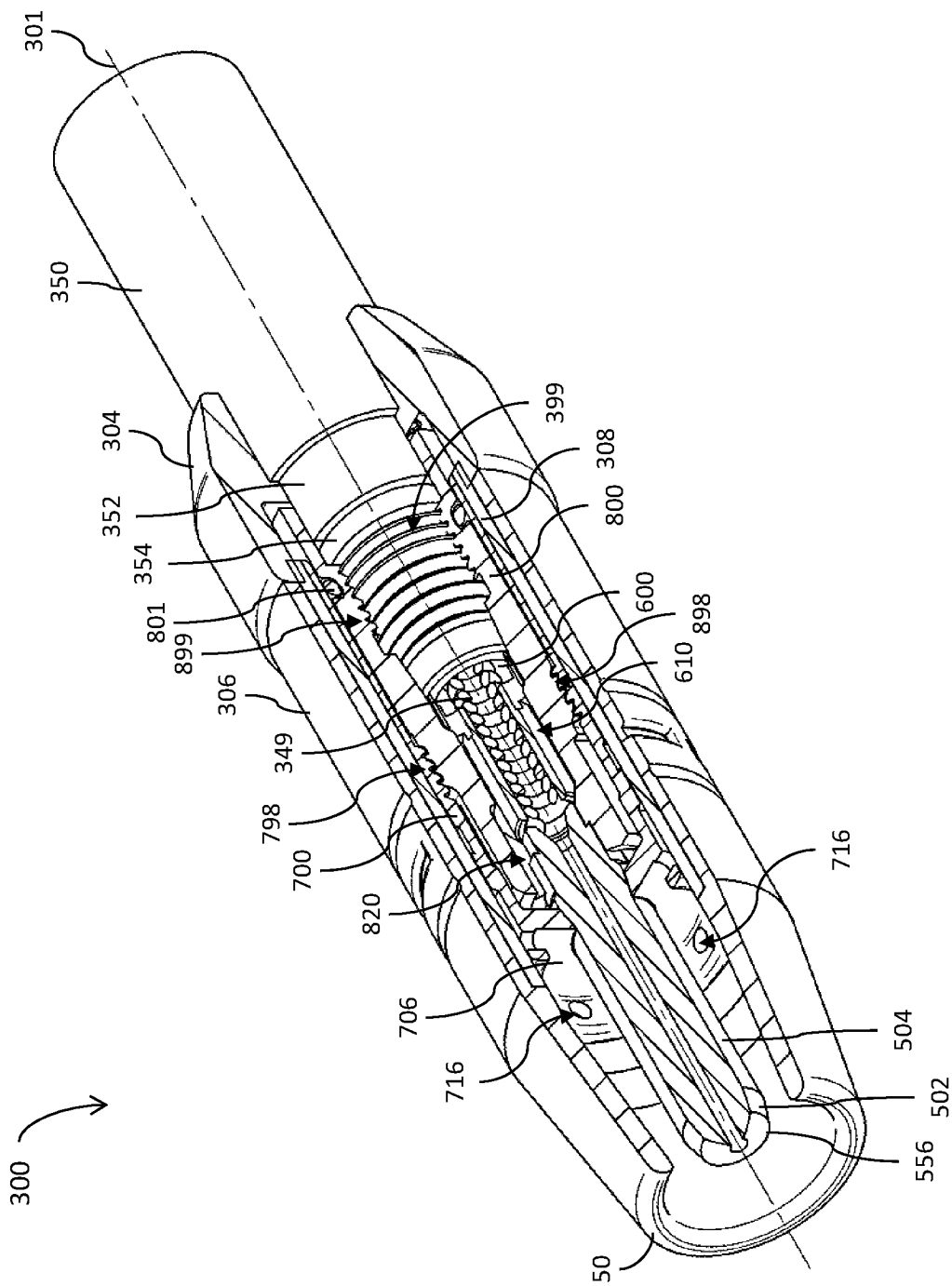
FIG. 9A is a perspective view of the example neck and nozzle assembly of FIG. 3A with some portions cut away, in accordance with aspects of this disclosure.
Figure 9B:
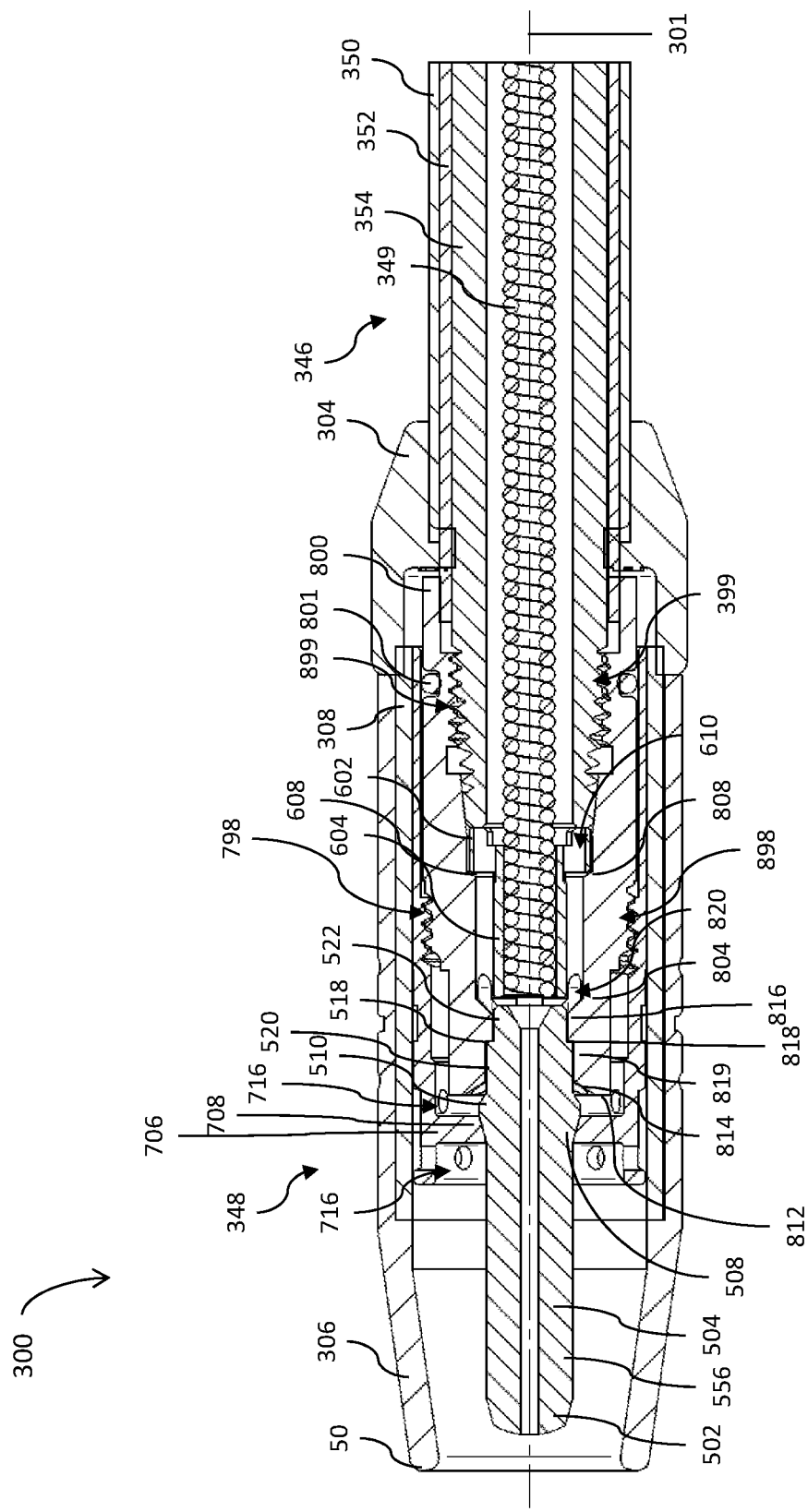
FIG. 9B is a cross-sectional view of the example neck and nozzle assembly of FIG. 3A (through the gas diffuser teeth), in accordance with aspects of this disclosure.
Figure 9C:
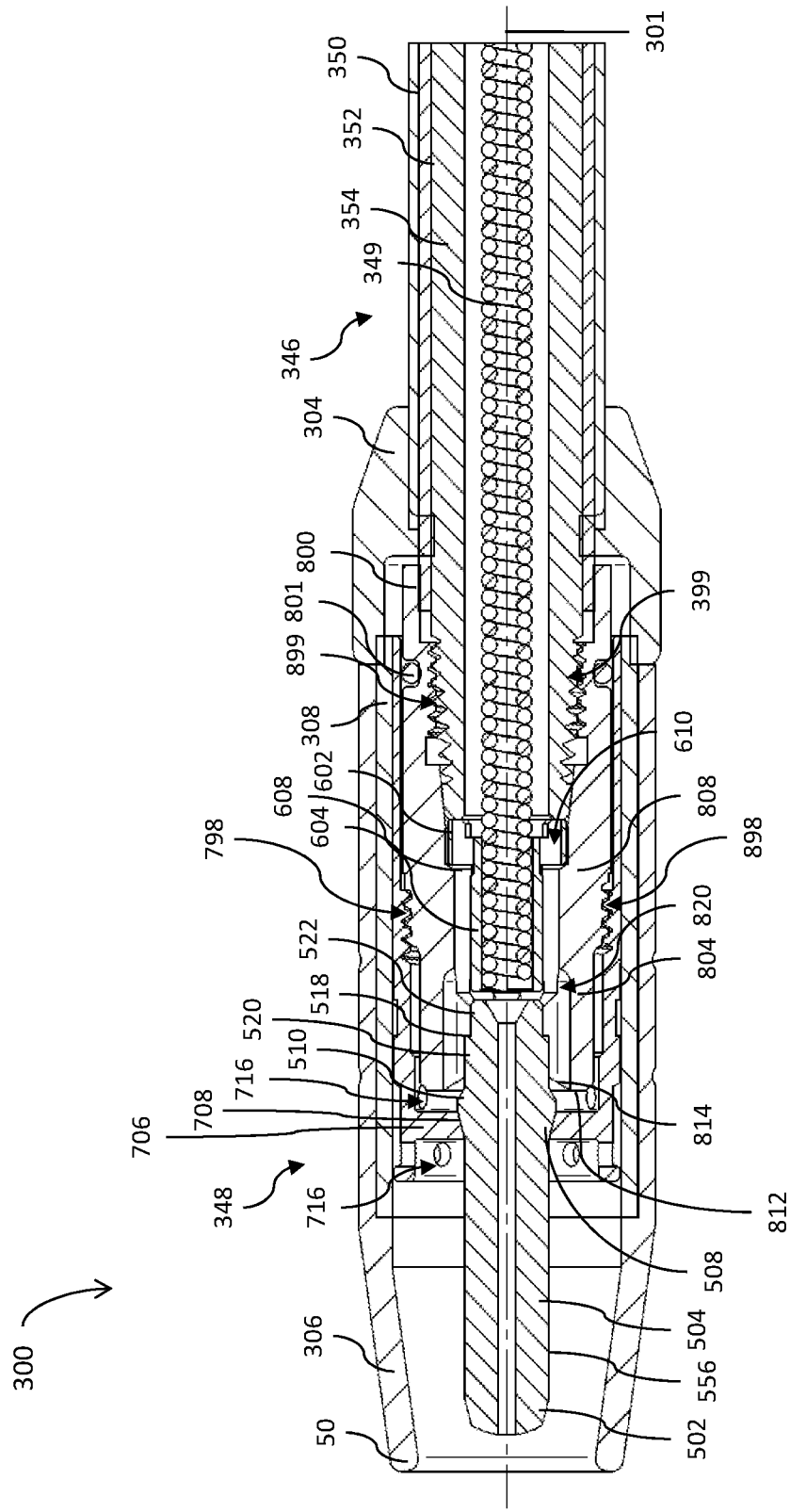
FIG. 9C is a cross-sectional view of the example neck and nozzle assembly of FIG. 3A (through the gas channels in the gas diffuser), in accordance with aspects of this disclosure.
Figure 9D:
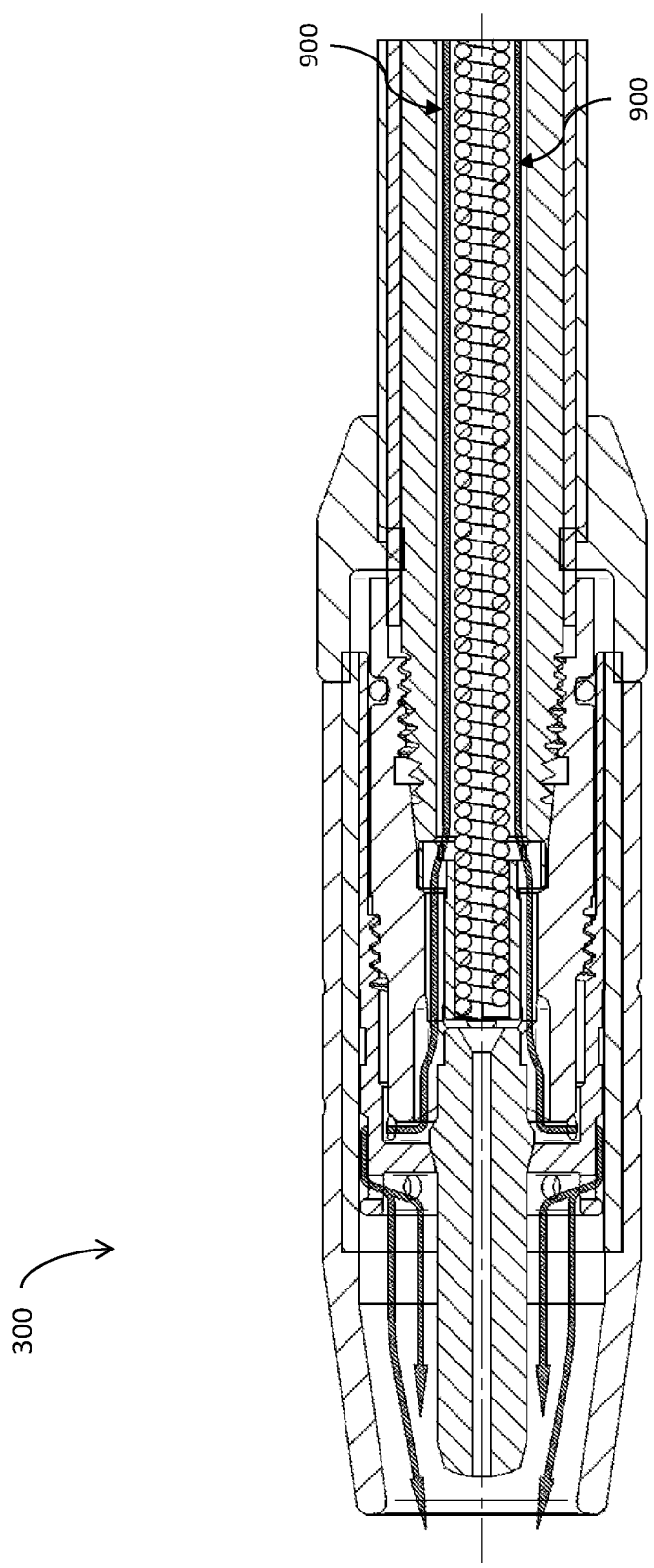
FIG. 9D shows gas flowing in the cross-sectional view of FIG. 9C, in accordance with aspects of this disclosure.

FIG. 9A shows a perspective view of the fully assembled example neck and nozzle assembly 300, with a portion cutaway. FIGS. 9B-9D show cross-sectional views of the example neck and nozzle assembly 300. FIG. 9B shows a cross-sectional view through the teeth 816 of the gas diffuser 800 (similar to FIG. 8E). FIG. 9C shows a cross-sectional view through the gas channels 820 in the gas diffuser 800 (similar to FIG. 8F). FIG. 9D shows the cross-sectional view of FIG. 9C with an example gas flow 900.

In the examples of FIGS. 9A-9D, the tip-retention device 700 and gas diffuser 800 cooperate to retain the contact tip 556 within the neck and nozzle assembly 300. More particularly, the tip-retention device 700 and gas diffuser 800 interface (and/or engage) with the rear portion 506 of the contact tip 556 to retain the contact tip 556 within the neck and nozzle assembly 300. More precisely, the forward taper 508 of the contact tip 556 interfaces (e.g., engages) with the taper 708 of the tip-retention wall 706 of the tip-retention device 700, and the stepped profile 516 and/or shoulder 518 of the contact tip 556 interfaces (and/or engages) with the shelves 818 of the teeth 816 of the gas diffuser 800. The contact tip 556 is locked in place between the tip-retention wall 706 of the tip-retention device 700 and the seat of the gas diffuser 800. In some examples, the contact tip 556 does not need its own threads to be locked in place. In some examples, the rear end of the contact tip 556 rests against the liner assembly 302.

In the examples of FIGS. 9A-9D, the liner lock 600 is disposed within the gas diffuser 800. The liner lock shoulder 608 abuts the interior shoulder 808 of the gas diffuser 800, which helps to position and/or align the liner assembly 302 (and/or an electrode 18 moving within the liner assembly 302) with the interior bore of the contact tip 556. The screw threads 898 of the gas diffuser 800 are engaged with the screw threads 798 of the tip-retention device 700 to couple the tip-retention device 700 to the gas diffuser 800. The tip-retention device 700 retained within the nozzle insulator 308 with a friction fit. The gas diffuser 800 is further coupled to the neck assembly 346 via interior screw threads 899 of the gas diffuser 800 engaging with outer screw threads 399 of the neck assembly 346.

In operation, gas flow 900 (and/or a convection current) may flow through the neck and nozzle assembly 300. FIG. 9D shows example gas flow through a cross-sectional view of an example of assembled portions of the welding torch according to the present disclosure. Referring to FIG. 9D, the gas flow 900 (e.g., shielding gas) moves through the neck assembly 346 to the gas diffuser 800. More particularly, the gas flow 900 moves between the liner coil 349 and the neck inner portion 354, generally parallel to the longitudinal axis 301. After exiting the neck inner portion 354, the gas flow 900 moves through the ports 610 in the liner lock 600 to move from the neck assembly 346 to the gas diffuser 800. The gas flow 900 then proceeds through the channels 820 and across (and/or along, over, etc.) the rear portion 506 of the contact tip 556. In particular, the gas passes over the profile 516 and the deflector surface 510 of the contact tip 556 and cools the contact tip 556. The deflector surface 510 and/or the profile 516 may be structurally designed to cool the contact tip 556 the appropriate amount for particular applications (e.g., welding, cladding, cutting, etc.) and/or for particular size parameters or tolerances. By cooling the contact tip 556 during operations, the life of the contact tip 556 can be extended.

The deflector surface 510 is configured not only to cool the contact tip 556, but also to deflect the gas in a general direction away from the axis of the contact tip 556. The deflector surface 510 may be configured so as to direct gas flow in such a way that the gas flow remains laminar, rather than becoming turbulent. In the example of FIG. 9D, the gas flow 900 is directed radially outward (approximately orthogonal to the axis 301) by the deflector 510 of the contact tip 556 and the tip-retention wall 706, toward the gas holes 716 on the rear side of the tip-retention wall 706. The gas flow moves through the gas holes 716, and is redirected by the nozzle insulator 308 towards the front end 50, along a path generally parallel with the axis 301. The leading edge 710 of the tip-retention device 700 then directs the gas flow 900 radially inward through the gas holes 716 on the front side of the tip-retention wall 706. Once through the gas holes 716, the gas flow 900 again flows across the contact tip 556, providing more cooling flow. Finally, the gas flow 900 proceeds out through the front end 50 of the nozzle assembly 348.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A gas diffuser for use in a welding application, comprising:
    a seat configured to retain an outer surface of a contact tip within a gas flow path on an interior of a front end of the gas diffuser, wherein the seat is defined by a plurality of teeth that extend from an interior surface of the gas diffuser toward a longitudinal axis of the gas diffuser, wherein each tooth comprises a shelf configured to abut a rear-facing surface of the contact tip, and wherein the gas flow path extends through channels that are between the teeth along the outer surface of the contact tip when the contact tip is retained within the gas diffuser.

2. The gas diffuser of claim 1, wherein the seat is configured to interface with the outer surface of the contact tip to retain the contact tip within the gas diffuser.

3. The gas diffuser of claim 2, further comprising a nose that encircles a hollow interior, wherein the teeth extend from an interior surface of the nose into the hollow interior.

4. The gas diffuser of claim 3, wherein a diameter of the hollow interior is larger at the axial gas channels than at the teeth.

* * * * *